(12) United States Patent
Mondal et al.

(10) Patent No.: US 10,559,067 B2
(45) Date of Patent: Feb. 11, 2020

(54) REMOVAL OF SHADOWS FROM DOCUMENT IMAGES WHILE PRESERVING FIDELITY OF IMAGE CONTENTS

(71) Applicant: Adobe Inc., San Jose, CA (US)

(72) Inventors: Prasenjit Mondal, West Midnapore (IN); Ruppesh Nalwaya, Sunnyvale, CA (US); Ram Bhushan Agrawal, Noida (IN); Deepanshu Arora, Delhi (IN); Anuj Shara, Delhi (IN)

(73) Assignee: Adobe Inc., San Jose, CA (US)

( * ) Notice: Subject to any disclaimer, the term of this patent is extended or adjusted under 35 U.S.C. 154(b) by 227 days.

(21) Appl. No.: 15/907,526

(22) Filed: Feb. 28, 2018

(65) Prior Publication Data

US 2019/0266706 A1 Aug. 29, 2019

(51) Int. Cl.
*G06K 9/40* (2006.01)
*G06T 5/00* (2006.01)
*G06T 5/20* (2006.01)

(52) U.S. Cl.
CPC ............... *G06T 5/002* (2013.01); *G06T 5/20* (2013.01); *G06T 2207/20032* (2013.01)

(58) Field of Classification Search
CPC ............ G06T 7/11; G06T 2207/10036; G06T 2207/20032; G06T 7/194; G06T 5/008; G06K 9/00; G06K 9/0063; G06K 9/344; H04N 5/272

USPC ......................... 382/174, 199, 187, 266, 274
See application file for complete search history.

(56) References Cited

U.S. PATENT DOCUMENTS

| 7,265,871 | B2 * | 9/2007 | Ishii | ......................... | H04N 1/58 |
| | | | | | 358/1.9 |
| 9,391,774 | B1 * | 7/2016 | Strauss | ...................... | H04L 9/32 |
| 9,852,498 | B2 | 12/2017 | Bako et al. | | |
| 2014/0067631 | A1 * | 3/2014 | Dhuse | .................... | G06Q 40/10 |
| | | | | | 705/30 |

OTHER PUBLICATIONS

"Adobe Scan 1.0", retrieved from the Internet:https://adobe-scan.en.uptodown.com/android/download/1630195 [copy retrieved Jul. 10, 2018], 2 pages.

* cited by examiner

*Primary Examiner* — Charlotte M Baker
(74) *Attorney, Agent, or Firm* — Finch & Maloney PLLC

(57) ABSTRACT

Techniques are disclosed for generating a shadow map of a digital image. In some examples, a method may include generating a shadow mask of a digital image, generating a dilated de-noised binarized gradient image based on the shadow mask, generating a binarized median-filtered gray image based on the digital image and the dilated de-noised binarized gradient image, and generating a shadow map based on the shadow mask and the binarized median-filtered gray image. The generated shadow map can then be used to remove shadows from the digital image without degrading the quality of the image content in the digital image.

20 Claims, 20 Drawing Sheets

[Shadow Map $I_{FINAL\_INTERPOLATE}$]

[Shadow Removed Original Document Image]

REMOVAL OF SHADOWS FROM DOCUMENT IMAGES WHILE PRESERVING FIDELITY OF IMAGE CONTENTS

FIELD OF THE DISCLOSURE

This disclosure relates generally to image processing, and more particularly, to removal of shadows from digital images.

BACKGROUND

Mobile communication devices, such as mobile phones are now ubiquitous. In addition, most mobile phones include cameras, and in many instances high resolution cameras, which allow users the ability to capture images of documents as well as natural scenes. In addition, electronic documents have rapidly gained acceptance as a convenient replacement for conventional paper documents. To this end, people are increasingly using their mobile phones to capture images of documents. For example, digital images of documents, receipts, menus, flyers, magazines, and other text are frequently captured for dissemination or for use in applications such as optical character recognition (OCR). Yet, using mobile phones to capture document images in this manner commonly results in the introduction of shadows into these images. And, the presence of shadows is undesirable and degrades the quality of the captured document images.

Digital image editing applications are available that provide shadow removal capabilities. For example, after capturing a document image, a user can use any of these applications to, for instance, remove the shadowing within a given document image. Many of these editing applications typically utilize a shadow mask of a document image to remove the shadows from the document image. However, in addition to identifying areas of shadows in a document image, a shadow mask may also include dark regions that inadvertently identify image contents, such as dark surfaces, dark objects, and drawings, in the document image. That is, the shadow mask may identify both regions of shadows and regions of image contents that are present in the document image. As a result, using a conventional shadow mask to remove the shadows from a document image can degrade the quality of image contents in the document image which were inadvertently identified in the shadow mask.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

Figure 1:
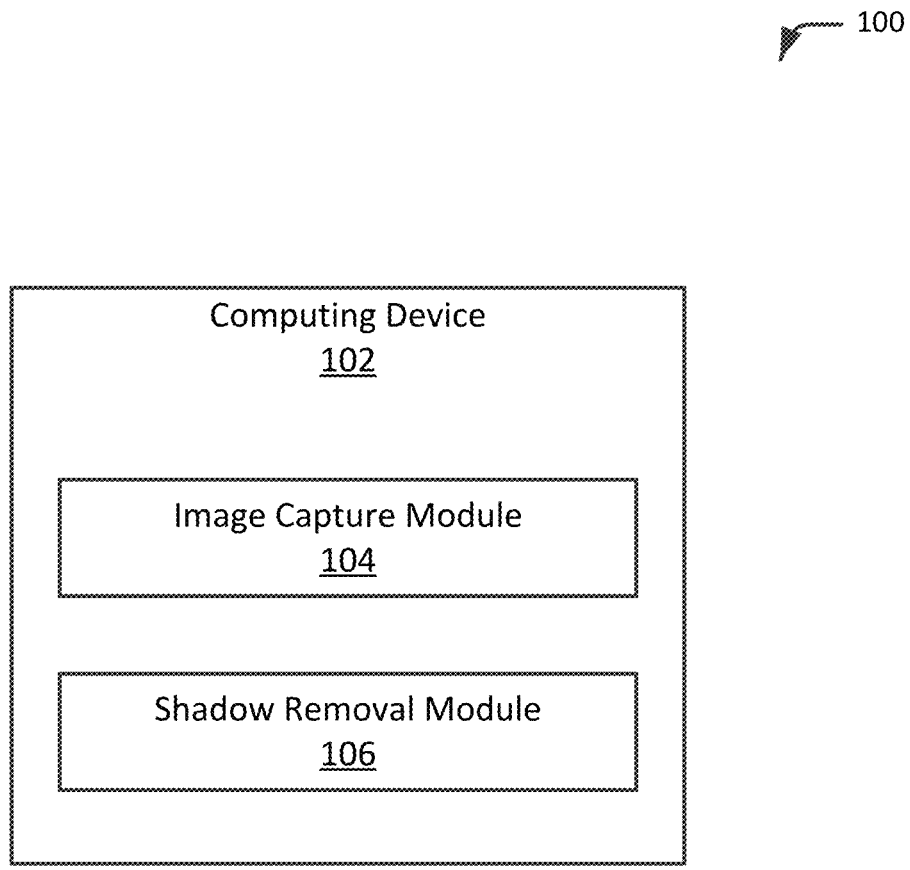
FIG. 1 illustrates selected components of an example automated video correction system, in accordance with an embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Techniques are disclosed for removing shadows from a digital image, such as a document image, using a shadow map. The shadow map is particularly useful in removing shadows from a document image without degrading the non-shadow image contents, such as text, drawings, dark surfaces or objects, or other expected objects and features, of the document image. However, as previously noted, a conventional shadow mask of a document image may identify regions of shadows as well as regions of image contents of the document image. In contrast, a shadow map in accordance with an embodiment of the present disclosure only identifies regions of shadows in the document image and effectively excludes dark regions that correspond to image contents of the document image. In some such embodiments, a shadow map is generated by first generating a conventional shadow mask of a document image from which shadows are to be removed. The generated conventional shadow mask is then modified by segmenting the shadow regions and the dark regions that correspond to image contents of the document image, and removing the dark regions from the conventional shadow mask to generate the shadow map. The shadow map can then be used to remove the shadows from the document image without degrading the quality of the image content (e.g., text, numbers, drawings, dark surfaces or objects, etc.) in the document image. For example, in the case of a document image that contains a color drawing, using a shadow map to remove the shadows does not fade the colors of the color drawing in the document image. In a more general sense, a shadow map facilitates the removal of shadows from an image document while preserving the quality of the image content in both color and grayscale document images.

According to various embodiments of the present disclosure, generating a shadow map of a document image includes decomposing the document image and a conventional shadow mask of the document image into a number of intermediate images from which the shadow map is generated. In more detail, a conventional shadow mask is first generated for a document image from which shadows are to be removed. As described previously, simply using the conventional shadow mask in its current state to remove the undesired shadows will also deteriorate the desired image contents of the document image. Instead, in accordance with certain of the embodiments disclosed herein, the conventional shadow mask is processed to generate an intermediate image that includes only the decidedly dark regions from the conventional shadow mask. The decidedly dark regions in this intermediate image serve to provide an indication of the approximate locations of the desired non-shadow image contents of the document image that are inadvertently identified in the conventional shadow mask. However, knowing the approximate locations of the desired image contents of the original document image that are identified in the conventional shadow mask is not enough to segment and remove the decidedly dark regions from the conventional shadow mask. Indeed, what is also needed to adequately remove the decidedly dark regions from the conventional shadow mask are good approximations of the size and shape of the various desired image contents of the document image that are inadvertently identified in the conventional shadow mask. To determine the size and shape of such image contents, the document image is processed to generate an intermediate image that includes large components that correspond to large objects or features (e.g., drawings, inverted text blocks or text blocks against a dark background, dark surfaces, etc.) that are present the document image. The large components in this intermediate image serve to provide good approximations of the size and shape of the desired large image contents in the document image. However, not all of the large components in this intermediate image may have been included in the conventional shadow mask. Thus, this intermediate image in its current state may not be suitable for use in segmenting and removing the decidedly dark regions from the conventional shadow mask without knowing which of the large components are identified in the conventional shadow mask. But, the approximate locations of the large components (e.g., desired non-shadow image contents) of the document image that are identified in the conventional shadow mask are provided by the intermediate image generated from the conventional shadow mask. Accordingly, this location information from the intermediate image generated from the shadow mask is utilized to process the intermediate image generated from the document image to effectively remove the large components that are not identified in the conventional shadow mask. The resulting intermediate image with the remaining large components can then be used to segment and remove the decidedly dark regions from the conventional shadow mask to generate a shadow map. The generated shadow map can then be used to remove the shadows in the document image while preserving the quality of the image contents in the document image.

Although certain embodiments and/or examples are described herein in the context of removing shadows from images of documents, it will be appreciated in light of this disclosure that such embodiments and/or examples are not restricted to document images but are applicable to digital images in the general sense. That is, the various embodiments of the shadow removal techniques as described herein can be utilized to remove shadows from digital images of contents other than documents. Moreover, the captured digital images, including document images, may be grayscale images, color images, or a combination of grayscale and color, which may or may not include grayscale or color image contents. These and other advantages and alternative embodiments will be apparent in light of this disclosure.

Turning now to the figures, FIG. 1 illustrates selected components of an example shadow removal system 100, in accordance with an embodiment of the present disclosure. As depicted, system 100 includes a computing device 102, which further includes an image capture module 104 and a shadow removal module 106. In various embodiments, computing device 102 may be a mobile device, such as a mobile phone, a tablet computing device, and a smart phone, to name a few examples, and be configured to execute image capture module 104 and shadow removal module 106. Image capture module 104 is configured to provide capturing of digital images using a camera (not depicted) of, or coupled to, computing device 102. For instance, a captured digital image may be of a paper document or other suitable content such as printed or displayed texts and drawings, objects, and natural scenes, to name a few examples. Examples of paper documents include various combinations of printed text documents, printed images, receipts, menus, maps, pages from books, brochures, and flyers, to name a few examples. Shadow removal module 106 is configured to receive or retrieve a captured image, and perform removal of shadows from the captured digital image as described above, and as will be described in further detail with respect to FIGS. 2A, 2B, 3, 4, and 5.

In various embodiments, additional components (not illustrated, such as a processor, display, user input device, non-transitory memory, etc.) or a subset of the illustrated components can be employed without deviating from the scope of the present disclosure. For instance, other embodiments may integrate the various functionalities of modules 104 and 106 into fewer modules (e.g., one) or more modules (e.g., three or four, or more). In addition, further note that the various components of computing device 102 may all be in a stand-alone computing system according to some embodiments, while in others, may be distributed across multiple machines. For example, module 106 may be provided in a computing system distinct from computing device 102. In a more general sense, the degree of integration and distribution of the functional component(s) provided herein can vary greatly from one embodiment to the next, as will be appreciated in light of this disclosure.

Figure 2A:
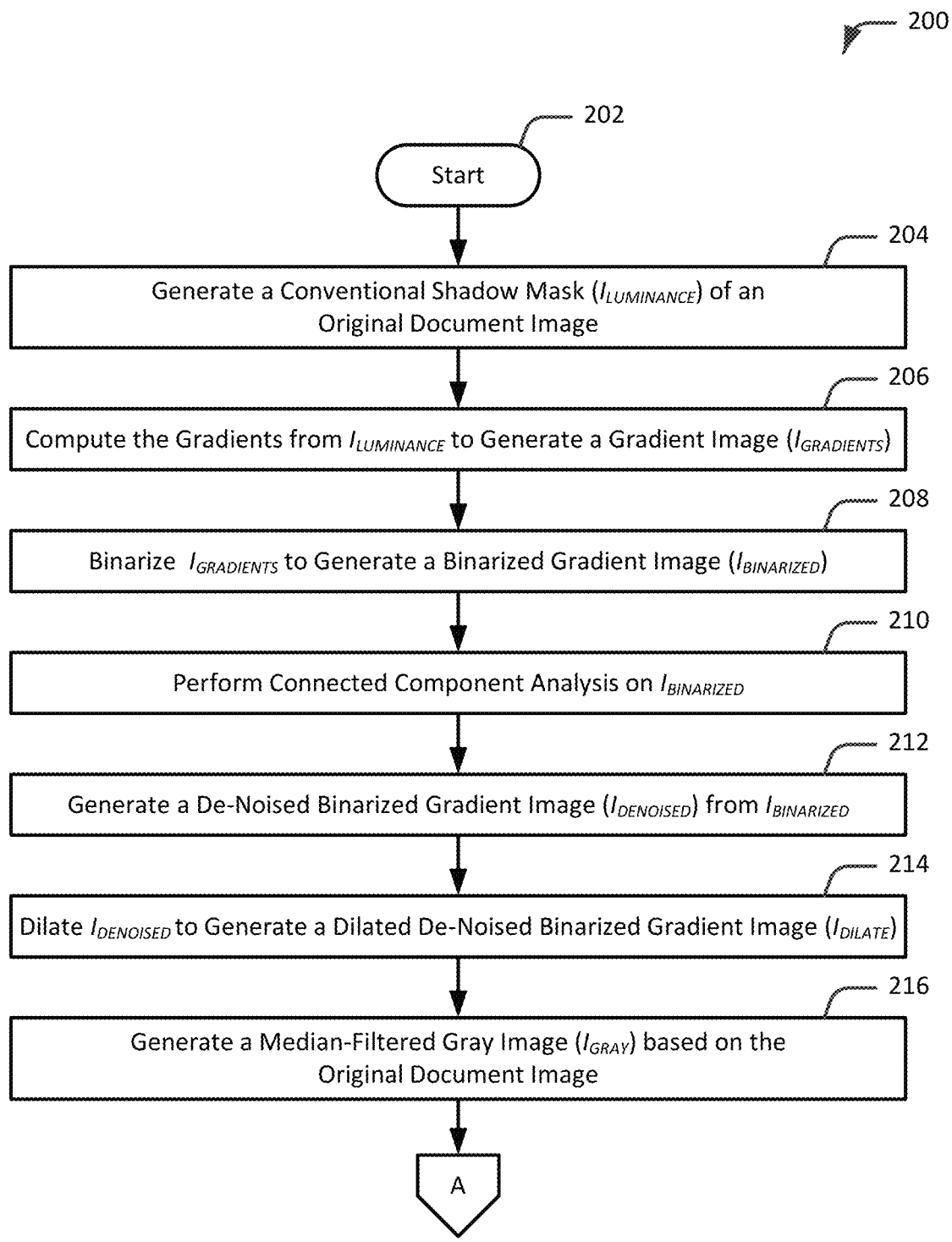
FIGS. 2A and 2B collectively show a flow diagram illustrating an example process to remove shadows from a document image using a shadow map, in accordance with an embodiment of the present disclosure.
Figure 2B:
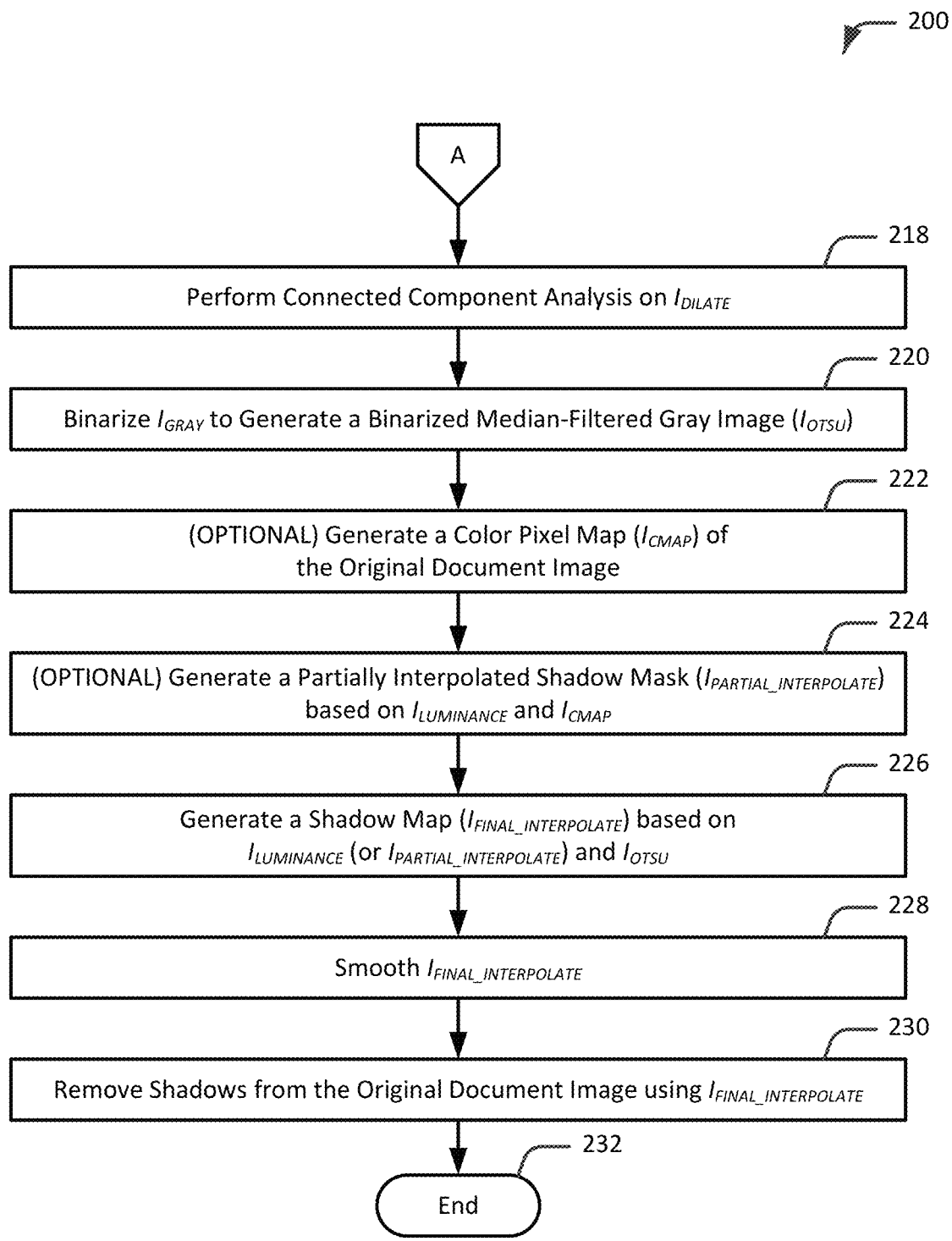
Figure 3:
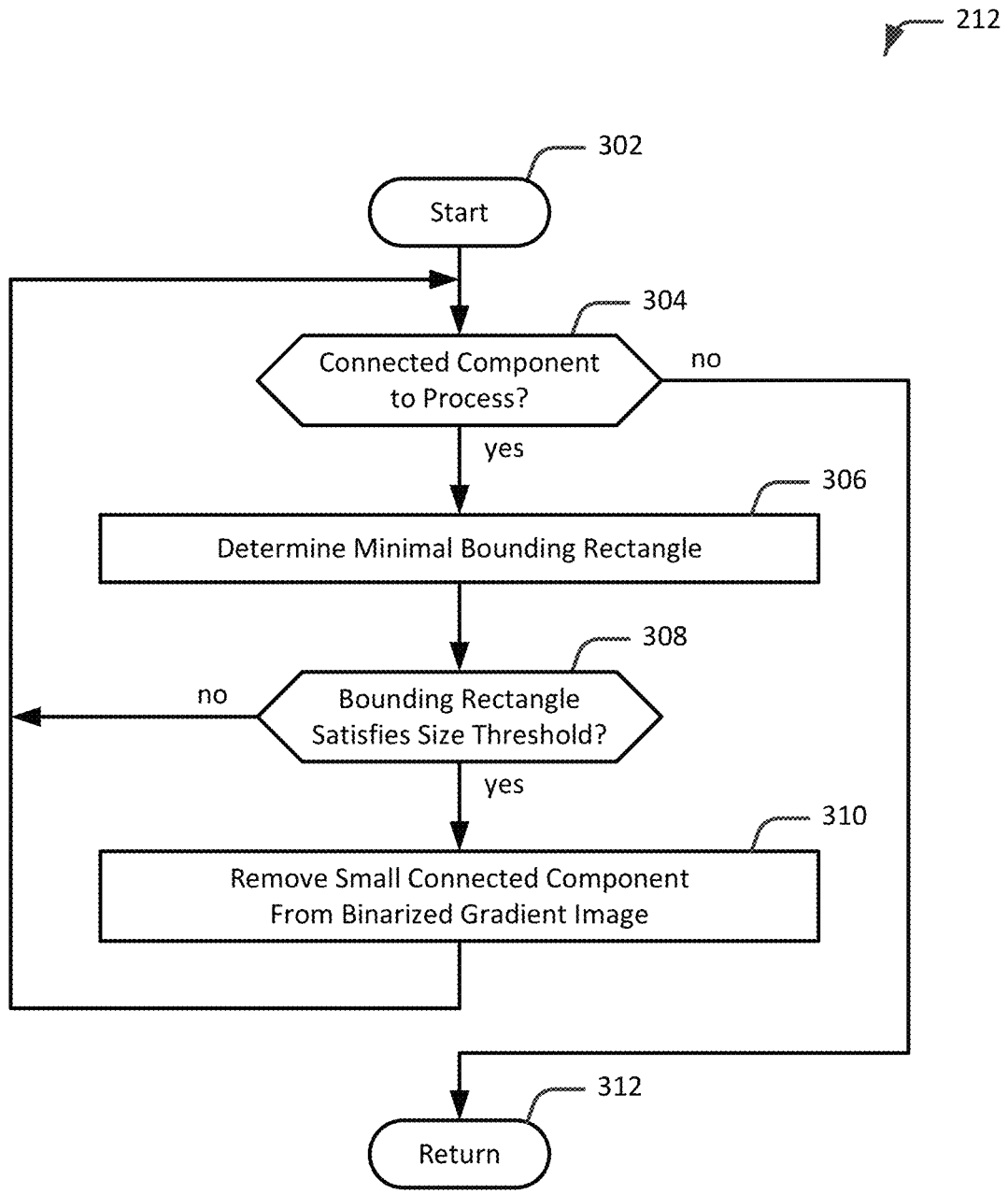
FIG. 3 is a flow diagram illustrating an example process to generate a de-noised binarized gradient image from a binarized gradient image, in accordance with an embodiment of the present disclosure.
Figure 4:
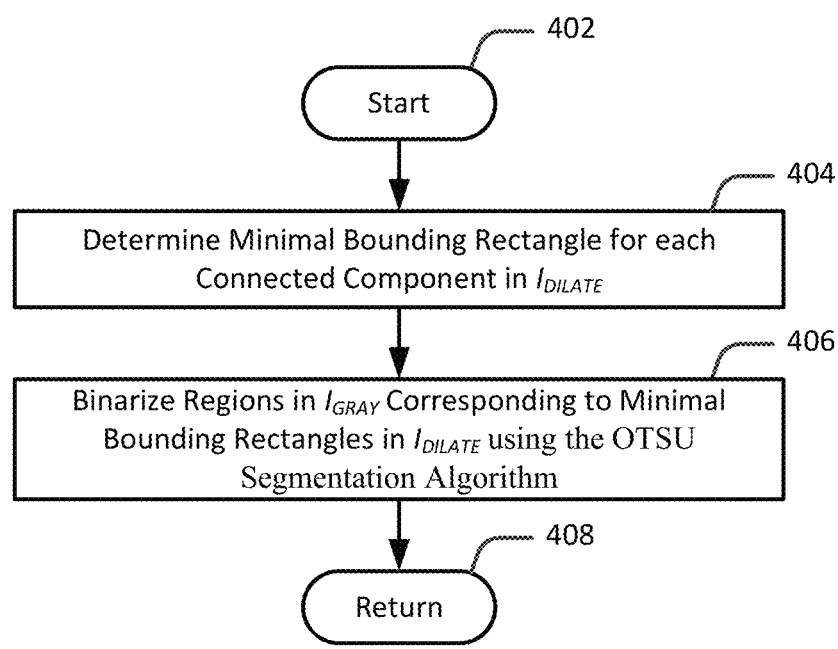
FIG. 4 is a flow diagram illustrating an example process to generate a binarized median-filtered gray image ($I_{OTSU}$) from a median-filtered gray image ($I_{GRAY}$) using the OTSU segmentation algorithm, in accordance with an embodiment of the present disclosure.
Figure 5:
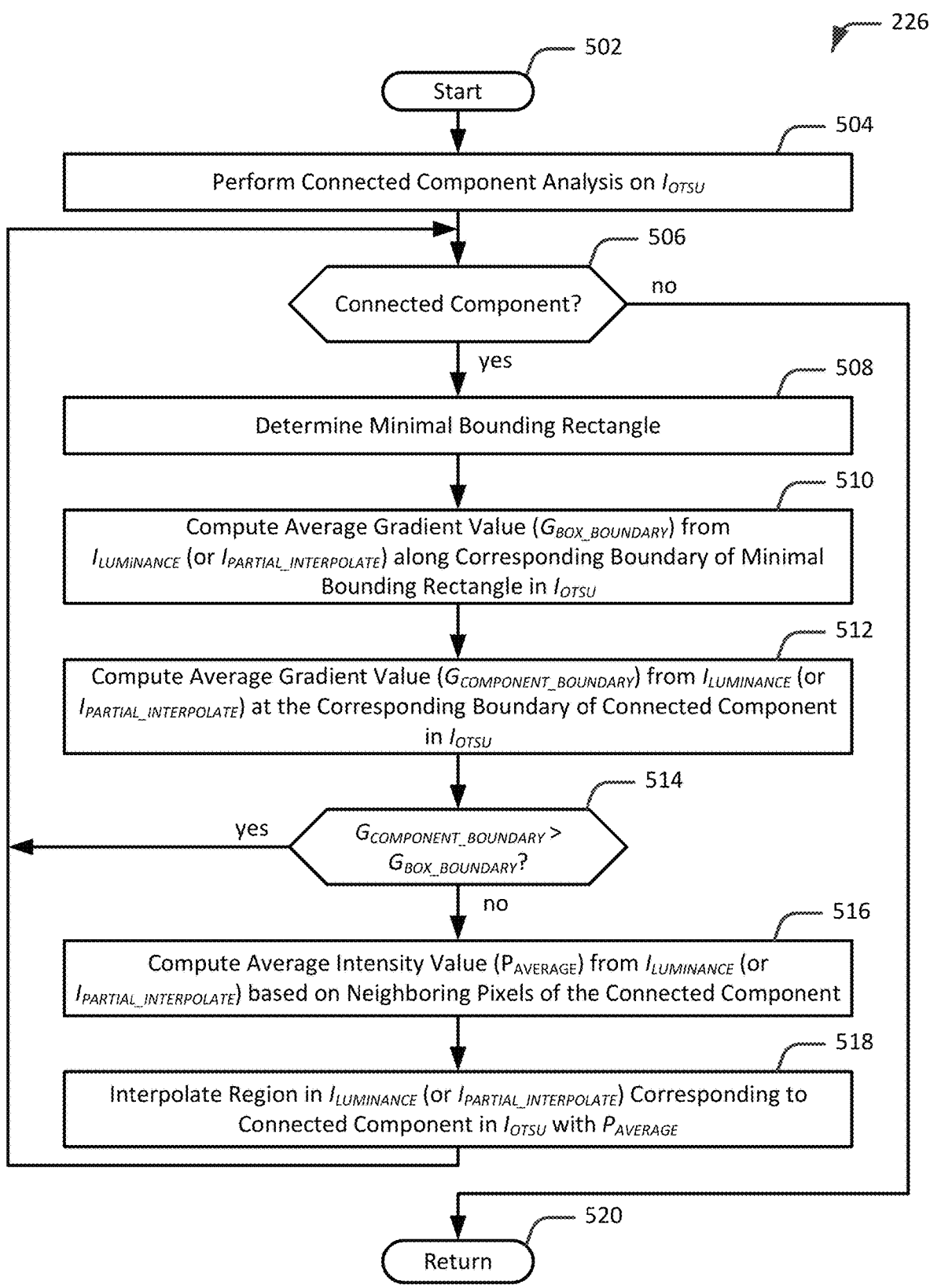
FIG. 5 is a flow diagram illustrating an example process to generate a shadow map based on $I_{LUMINANCE}$ and $I_{OTSU}$, in accordance with an embodiment of the present disclosure.

FIGS. 2A and 2B collectively show a flow diagram illustrating an example process 200 to remove shadows from a document image using a shadow map, in accordance with an embodiment of the present disclosure. FIG. 3 is a flow diagram illustrating an example process to generate a de-noised binarized gradient image from a binarized gradient image, in accordance with an embodiment of the present disclosure. FIG. 4 is a flow diagram illustrating an example process to generate a binarized median-filtered gray image ($I_{OTSU}$) from a median-filtered gray image ($I_{GRAY}$) using the OTSU segmentation algorithm, in accordance with an embodiment of the present disclosure. FIG. 5 is a flow diagram illustrating an example process to generate a shadow map based on $I_{LUMINANCE}$ and $I_{OTSU}$, in accordance with an embodiment of the present disclosure. The operations, functions, or actions illustrated in example process 200 and the example processes depicted in FIGS. 3-5 may in some embodiments be performed by shadow removal system 100 and, more particularly, shadow removal module 106 of computing device 102 of FIG. 1. The operations, functions, or actions described in the respective blocks of example process 200 and the example processes of the flow diagrams depicted in FIGS. 3-5 may also be stored as computer-executable instructions in a computer-readable medium, such as memory 1904 and/or data storage 1906 of a computing system 1900. The processes may be performed by components of computing device 102.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Figure 6:
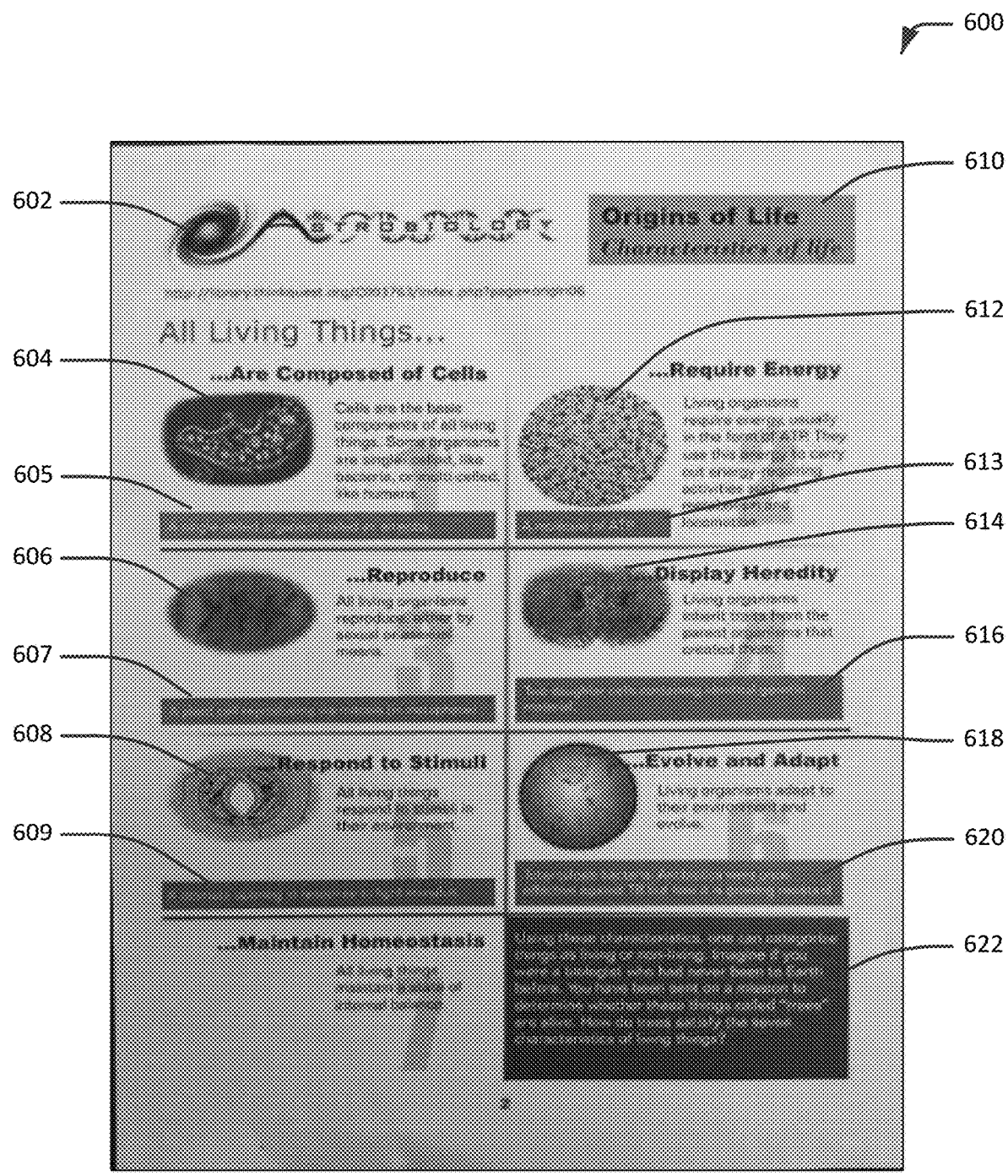
FIG. 6 is a diagram illustrating an example original document image.

With reference to the example process of FIGS. 2A and 2B, a computing device, such as computing device 102, which includes shadow removal module 106, may perform shadow removal from a captured image. By way of an example use case, a user can use computing device 102 to capture an image of a paper document that contains image contents (e.g., text, text blocks, drawings, etc.), thus generating a document image. FIG. 6 is a diagram illustrating an example original document image 600. Original document image 600 may be the document image captured by the user using computing device 102. Original document image 600 may include various types and sizes of image contents. As shown in FIG. 6, original document image 600 includes image contents 602, 604, 605, 606, 607, 608, 609, 610, 612, 613, 614, 616, 618, 620, and 622, which are generally dark objects of significant size in original document image 600. Moreover, each of these dark objects is generally larger and of a darker gray shade or color than the size and darkness of the text and other small components in original document image 600. More specifically, for instance, image contents 602, 604, 606, 608, 614, and 618 may each be a grayscale drawing, image content 612 may be a color drawing, and image contents 605, 607, 609, 610, 613, 616, 620, and 622 may each be regions that include white text displayed against a black, rectangular bounding background. As can also be seen in FIG. 6, original document image 600 is generally affected throughout by a shadow or other undesired artifacts as illustrated by the varying intensities of gray shading in the background of original document image 600. For example, the paper document that is captured to generate original document image 600 may have a relatively bright background of a constant color, such as white (e.g., printed on white paper), and the gray shading in the background in original document image 600 may be indicative of a shadow or other undesired artifacts. The shadow and other undesired artifacts in original document image 600 may, for instance, be caused by occlusion of light when capturing original document image 600 using an image capturing device, such as computing device 102. The undesired artifacts may also be caused by blooming, chromatic aberration, color cast, lens flare, mottle, and sensor dust, to name a few examples. In any case, the gray shading that signifies the shadowing in original document image 600 is generally of a lighter gray intensity than the gray or color intensity of the image contents in original document image 600. Having generated original document image 600, the user can utilize shadow removal module 106 of computing device 102, or of a different computing device, to remove the shadows that are present in original document image 600.

Referring again to FIGS. 2A and 2B, process 200 is initiated at block 202. At block 204, shadow removal module 106 generates a conventional shadow mask of original document image 600. The conventional shadow mask of original document image 600 can be generated using any existing technique to compute a shadow mask. One suitable technique is based on luminous intensity, where each pixel in the conventional shadow mask is set to the highest luminance level of a corresponding pixel in original document image 600. For example, the luminance of pixel (1, 1) in the conventional shadow mask is set to the highest luminance level of corresponding pixel (1, 1) in original document image 600. Similarly, the luminance of every other pixel (a, b) in the conventional shadow mask is set to the highest luminance level of the corresponding pixel (a, b) in original document image 600. In the case of a color image, as is the case of original document image 600, the highest luminance level of each pixel in original document image 600 may be determined by computing the histogram dissension, where the Y channel represents a measure of luminance in the YCbCr color space, accumulating the Y channel values for a suitable window (e.g., 3 pixel×3 pixel, 5 pixel×5 pixel, 7 pixel×7 pixel, etc.) around the pixel under consideration, and selecting the highest luminance value. For the CIE-Lab color space, the L channel represents the measure of luminance, and the L channel values can be accumulated for a suitable window around a pixel under consideration. Other suitable techniques may be utilized to generate the conventional shadow mask, as will be apparent to one of skill in the art.

Figure 7:
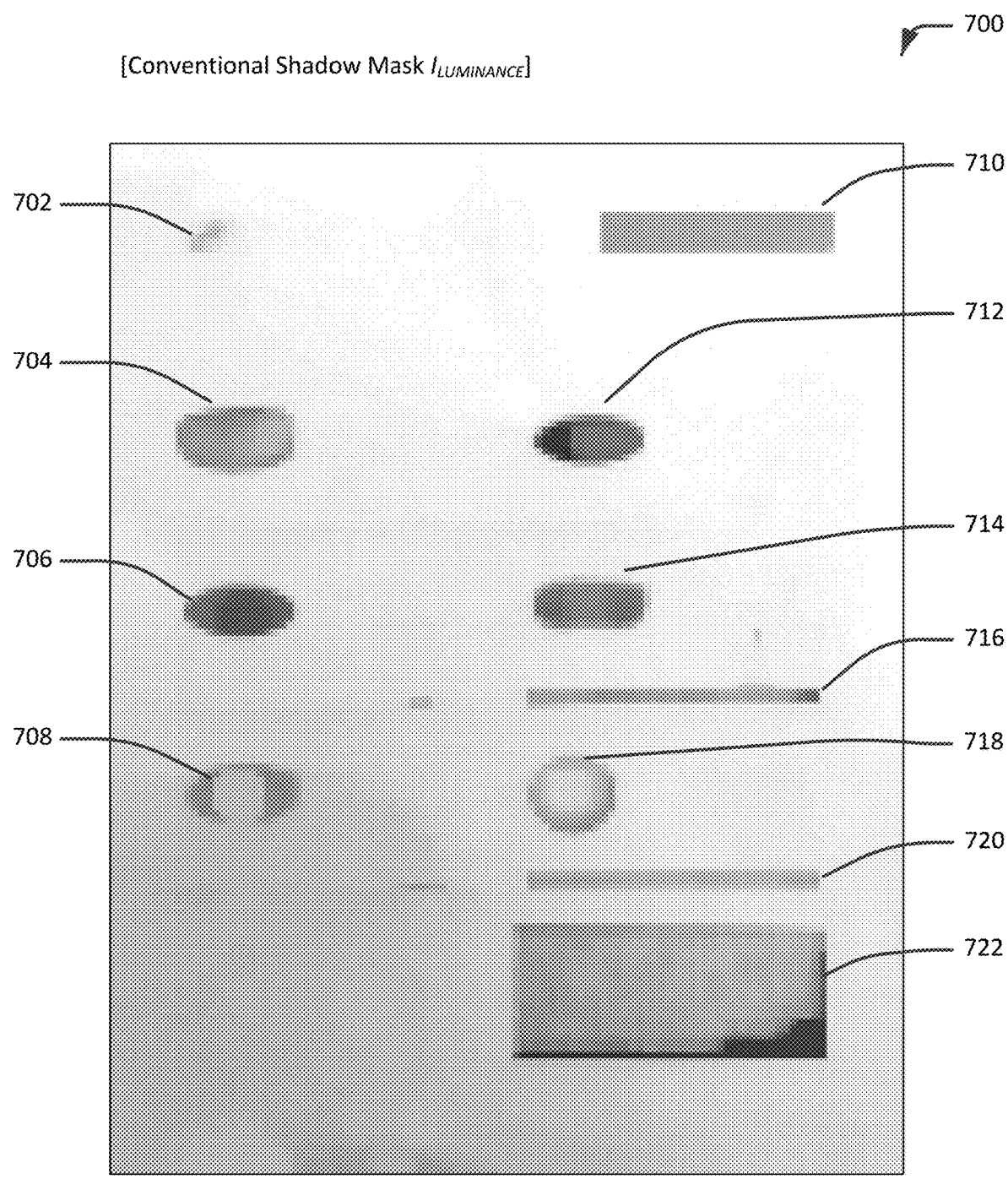
FIG. 7 is a diagram illustrating an example conventional shadow mask ($I_{LUMINANCE}$) of the original document image of FIG. 6.

FIG. 7 is a diagram illustrating an example conventional shadow mask ($I_{LUMINANCE}$) 700 of original document image 600 of FIG. 6. $I_{LUMINANCE}$ 700 is a grayscale bitmap that includes dark regions that correspond to shadows and dark objects in original document image 600. As described previously, in some implementations, the luminance of each pixel in $I_{LUMINANCE}$ 700 is set to the highest luminance level of a corresponding pixel in original document image 600. It follows then that pixels associated with the dark objects in original document image 600 will generally have much lower luminance values as a result of the darkness of these objects. It also follows that pixels located in regions of original document image 600 affected by shadows will also have lower luminance values, while pixels located in regions of original document image 600 not affected by shadows or dark objects will have higher luminance values. Accordingly, as shown in FIG. 7, the dark regions in $I_{LUMINANCE}$ 700 may be the result of the low luminance of the pixels in regions of original document image 600 affected by shadows, and the darker regions in $I_{LUMINANCE}$ 700 may be the result of the lower luminance of the pixels associated with the dark objects in original document image 600. More specifically, $I_{LUMINANCE}$ 700 includes decidedly dark regions 702, 704, 706, 708, 710, 712, 714, 716, 718, 720, and 722, which correspond to image contents 602, 604, 606, 608, 610, 612, 614, 616, 618, 620, and 622, respectively, in original document image 600. Note that text and other similar small components in an image are generally not included in a shadow mask. Also note that, although possible, not all dark objects in an image may be included in a shadow mask. For example, as shown in FIG. 7, note the absence of decidedly dark regions in $I_{LUMINANCE}$ 700 for image contents 605, 607, 609, and 613 in original document image 600.

Referring again to FIGS. 2A and 2B and process 200, at block 206, shadow removal module 106 computes the gradients from the conventional shadow mask $I_{LUMINANCE}$ 700. Computing the gradients of an image measures the pixel to pixel changes in the image (e.g., the extent or degree to which the image is changing pixel to pixel). Based on the presumption that an image typically changes most quickly at the boundary between components (e.g., objects) in the image, computing the gradients allows for detecting the edges of the components in the image. In the case of $I_{LUMINANCE}$ 700, computing the gradients allows for detecting the edges of the decidedly dark regions in $I_{LUMINANCE}$ 700. In an example implementation, shadow removal module 106 can compute the gradients using a suitable filter, such as the Sobel operator. The Sobel operator is a 3×3 image gradient operator that computes an approximation of the image intensity function. At each pixel in the image, the result of the Sobel operator is either a corresponding gradient vector that points in the direction of the largest possible intensity increase, or the norm of this vector. Computing the gradients of $I_{LUMINANCE}$ 700 using such a filter generates a gradient image that emphasizes the edges of the decidedly dark regions in $I_{LUMINANCE}$ 700. For instance, such edges may correspond to the boundaries of the decidedly dark regions having very high pixel intensity differences. Other techniques, including other filters, may be employed to compute the gradients of an image, as will be apparent to one of skill in the art.

Figure 8:
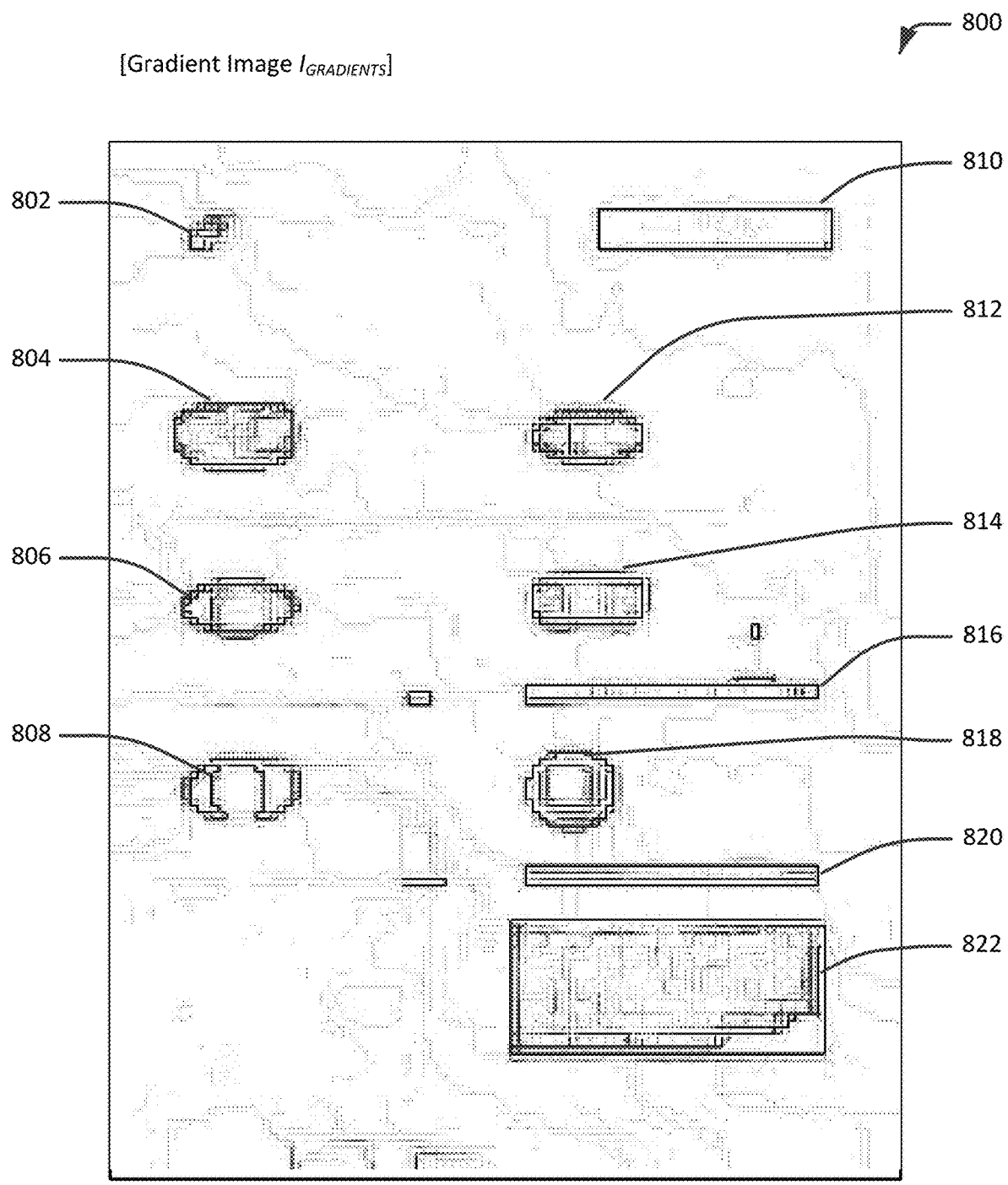
FIG. 8 is a diagram illustrating an example gradient image ($I_{GRADIENTS}$) based on the conventional shadow mask ($I_{LUMINANCE}$) of FIG. 7, in accordance with an embodiment of the present disclosure.

FIG. 8 is a diagram illustrating an example gradient image ($I_{GRADIENTS}$) 800 generated by computing the gradients of conventional shadow mask ($I_{LUMINANCE}$) 700 of FIG. 7, in accordance with an embodiment of the present disclosure. As shown in FIG. 8, $I_{GRADIENTS}$ 800 is a grayscale image, which includes dark lines that correspond to the edges of the decidedly dark regions in $I_{LUMINANCE}$ 700. More specifically, $I_{GRADIENTS}$ 800 includes strong edges 802, 804, 806, 808, 810, 812, 814, 816, 818, 820, and 822, which correspond to decidedly dark regions 702, 704, 706, 708, 710, 712, 714, 716, 718, 720, and 722, respectively, in $I_{LUMINANCE}$ 700. That is, the strong edges in $I_{GRADIENTS}$ 800 may signify the boundaries of the decidedly dark regions in $I_{LUMINANCE}$ 700. $I_{GRADIENTS}$ 800 also includes weak edges, which are the dark lines of lighter grayscale intensity than the darker lines of the strong edges. These weak edges in $I_{GRADIENTS}$ 800 may be noise, which may, for instance, be generated as a result of edges detected in the dark regions of $I_{LUMINANCE}$ 700 corresponding to shadows. $I_{GRADIENTS}$ 800 may also include other strong edges, which are the dark lines of similar grayscale intensity to the darker lines of strong edges 802, 804, 806, 808, 810, 812, 814, 816, 818, 820, and 822. These other strong edges in $I_{GRADIENTS}$ 800 may correspond to edges of small components or artifacts in $I_{LUMINANCE}$ 700 other than decidedly dark regions 702, 704, 706, 708, 710, 712, 714, 716, 718, 720, and 722.

Referring again to FIGS. 2A and 2B and process 200, at block 208, shadow removal module 106 binarizes $I_{GRADIENTS}$ 800 to generate a binarized gradient image. As described previously, $I_{GRADIENTS}$ 800 is a grayscale image that may include both strong edges and weak edges, and where such weak edges may be associated with noise. Binarizing a grayscale image removes the weak edges (e.g., noise) from the grayscale image, while maintaining the strong edges in a resulting binary image. In an example implementation, shadow removal module 106 can binarize $I_{GRADIENTS}$ 800 using any existing image segmentation technique for generating a binary image from a grayscale image. One suitable technique is a thresholding method that, for instance, replaces each pixel in a grayscale image with a black pixel in a binary image if the pixel intensity does not satisfy a specified intensity threshold (e.g., pixel intensity is below the specified intensity threshold). Otherwise, if the pixel intensity of a pixel satisfies the specified intensity threshold, the pixel in the grayscale image is replaced with a white pixel in the binary image. Accordingly, by specifying a suitable intensity threshold, pixels in the grayscale image associated with undesired artifacts, such as the weak edges in the case of $I_{GRADIENTS}$ 800, can be effectively removed by replacing these pixels with white pixels in the binary image. In some such embodiments, the intensity threshold can be set to a value to generate a binary image that includes the strong edges in $I_{GRADIENTS}$ 800 and effectively excludes the weak edges in $I_{GRADIENTS}$ 800.

Figure 9:
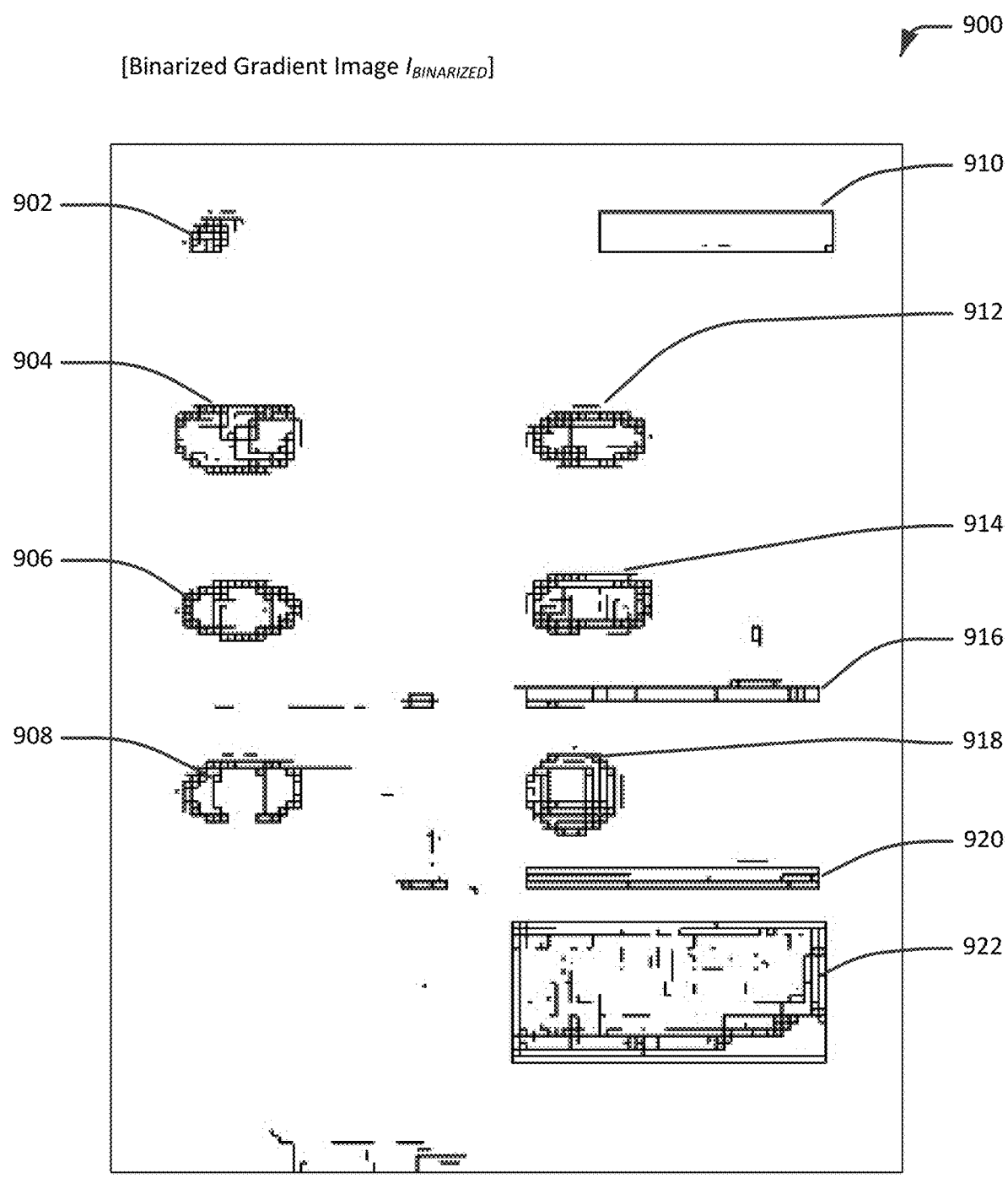
FIG. 9 is a diagram illustrating an example binarized gradient image ($I_{BINARIZED}$) based on the gradient image ($I_{GRADIENTS}$) of FIG. 8, in accordance with an embodiment of the present disclosure.

FIG. 9 is a diagram illustrating an example binarized gradient image ($I_{BINARIZED}$) 900 based on gradient image ($I_{GRADIENTS}$) 800 of FIG. 8, in accordance with an embodiment of the present disclosure. $I_{BINARIZED}$ 900 is a binary image, in which each pixel in the image is either a black pixel or a white pixel. As shown in FIG. 9, $I_{BINARIZED}$ 900 includes black pixel clusters 902, 904, 906, 908, 910, 912, 914, 916, 918, 920, and 922, which correspond to strong edges 802, 804, 806, 808, 810, 812, 814, 816, 818, 820, and 822, respectively, in $I_{GRADIENTS}$ 800. Note that $I_{BINARIZED}$ 900 may also include other black pixels, including other black pixel clusters, which correspond to imperfections or strong edges in $I_{GRADIENTS}$ 800 other than strong edges 802, 804, 806, 808, 810, 812, 814, 816, 818, 820, and 822, as described previously. Note the absence of the weak edges of $I_{GRADIENTS}$ 800 in $I_{BINARIZED}$ 900. In a more general sense, a grayscale image can be binarized to generate a binary image that effectively excludes the undesired artifacts, such as noise, that are in the grayscale image. Also note that $I_{BINARIZED}$ 900 may also include black pixels other than the black pixels associated with black pixel clusters 902, 904, 906, 908, 910, 912, 914, 916, 918, 920, and 922. These other black pixels may correspond to small or insignificant components that may be in $I_{BINARIZED}$ 900.

Referring again to FIGS. 2A and 2B and process 200, at blocks 210 and 212, shadow removal module 106 identifies and removes the insignificant components from $I_{BINARIZED}$ 900. As described previously, $I_{BINARIZED}$ 900 may include a number of other dark pixels in addition to the desired black pixel clusters, which correspond to the decidedly dark regions in the conventional shadow mask. These other dark pixels may likely be noise or other undesired artifacts that can be removed without impacting the processing of the desired black pixel clusters. Accordingly, at block 210, shadow removal module 106 performs a connected component analysis on $I_{BINARIZED}$ 900. Connected component analysis includes the identification and labeling of the connected components in an image. In the case of black pixels, connected component analysis includes identifying and labeling the connected black pixels in the image. Identification of the connected black pixels facilitates the determination of the sizes of the components and the subsequent removal of the noise and other undesired artifacts based on the determined size, as will be further described below. For instance, shadow removal module 106 can identify a first black pixel in $I_{BINARIZED}$ 900. This first black pixel is the first pixel of a connected component. Shadow removal module 106 then traverses and identifies all the black pixels that are connected to the first black pixel, and labels the identified black pixels as the connected components of the first black pixel. Having labeled a connected component, shadow removal module 106 proceeds to identify another black pixel (e.g., a second black pixel) in $I_{BINARIZED}$ 900, and identifies and labels the black pixels connected to the second black pixel as the connected components of the second black pixel. Shadow removal module 106 repeats this process for each black pixel in order to identify the connected components in $I_{BINARIZED}$ 900. Other suitable methods of performing the connected component analysis are envisioned and will be apparent to one of skill in the art.

At block 212, shadow removal module 106 generates a de-noised binarized gradient image from $I_{BINARIZED}$ 900. That is, having identified the connected components in $I_{BINARIZED}$ 900, shadow removal module 106 can now identify and remove the small connected components, which likely correspond to the insignificant components, such as noise or other undesired artifacts, in $I_{BINARIZED}$ 900. In brief, shadow removal module 106 determines the size of each connected component, and removes the small connected components while maintaining the large connected components (e.g., the connected components other than the removed small connected components) in the resulting de-noised binarized gradient image.

FIG. 3 is a flow diagram illustrating an example process to generate a de-noised binarized gradient image from a binarized gradient image, such as $I_{BINARIZED}$ 900, in accordance with an embodiment of the present disclosure. The process is initiated at block 302. At decision block 304, shadow removal module 106 checks to determine whether there is a connected component to process in $I_{BINARIZED}$ 900. That is, shadow removal module 106 checks to determine whether all the connected components in $I_{BINARIZED}$ 900 have been processed. If there is a connected component to process, at block 306, shadow removal module 106 determines a minimal bounding rectangle for the connected component being processed. The minimal bounding rectangle of the connected component specifies the maximum extents of the connected component within the connected component's 2-dimensional coordinate system. In this case, the minimal bounding rectangle of the connected component may provide a good approximation of the size of the enveloped connected component. At decision block 308, shadow removal module 106 checks to determine whether the minimal bounding rectangle satisfies a size threshold. Here, shadow removal module 106 is checking to determine whether the connected component enveloped in the minimal bounding rectangle is a small connected component as determined by the size threshold. If a size of the minimal bounding rectangle satisfies (i.e., the size is smaller than) the size threshold, the connected component enveloped in the minimal bounding rectangle is effectively removed from $I_{BINARIZED}$ 900. The size threshold may be set to a suitable size, such as 10 pixels×10 pixels, 11 pixels×11 pixels, 13 pixels×13 pixels, or any other suitable size. The size threshold may be tunable based on a desired performance. If the minimal bounding rectangle satisfies the size threshold, then, at block 310, shadow removal module 106 removes the connected component enveloped in the minimal bounding rectangle from $I_{BINARIZED}$ 900. For instance, according to an embodiment, shadow removal module 106 may replace each black pixel of the connected component with a white pixel. Having removed the small connected component, shadow removal module 106 returns to decision block 304 to process the next connected component in $I_{BINARIZED}$ 900. Otherwise, if the minimal bounding rectangle does not satisfy the size threshold, shadow removal module 106 returns to decision block 304 to process the next connected component in $I_{BINARIZED}$ 900. In this instance, the connected component enveloped in the minimal bounding rectangle is deemed not to be a small connected component and is not removed from $I_{BINARIZED}$ 900. If, at decision block 304, shadow removal module 106 determines that there is no more connected component to process in $I_{BINARIZED}$ 900, shadow removal process 106, at block 312, returns. Once all the minimal bounding rectangles are processed in this manner, the resulting image is a de-noised BINARIZED 900.

Figure 10:
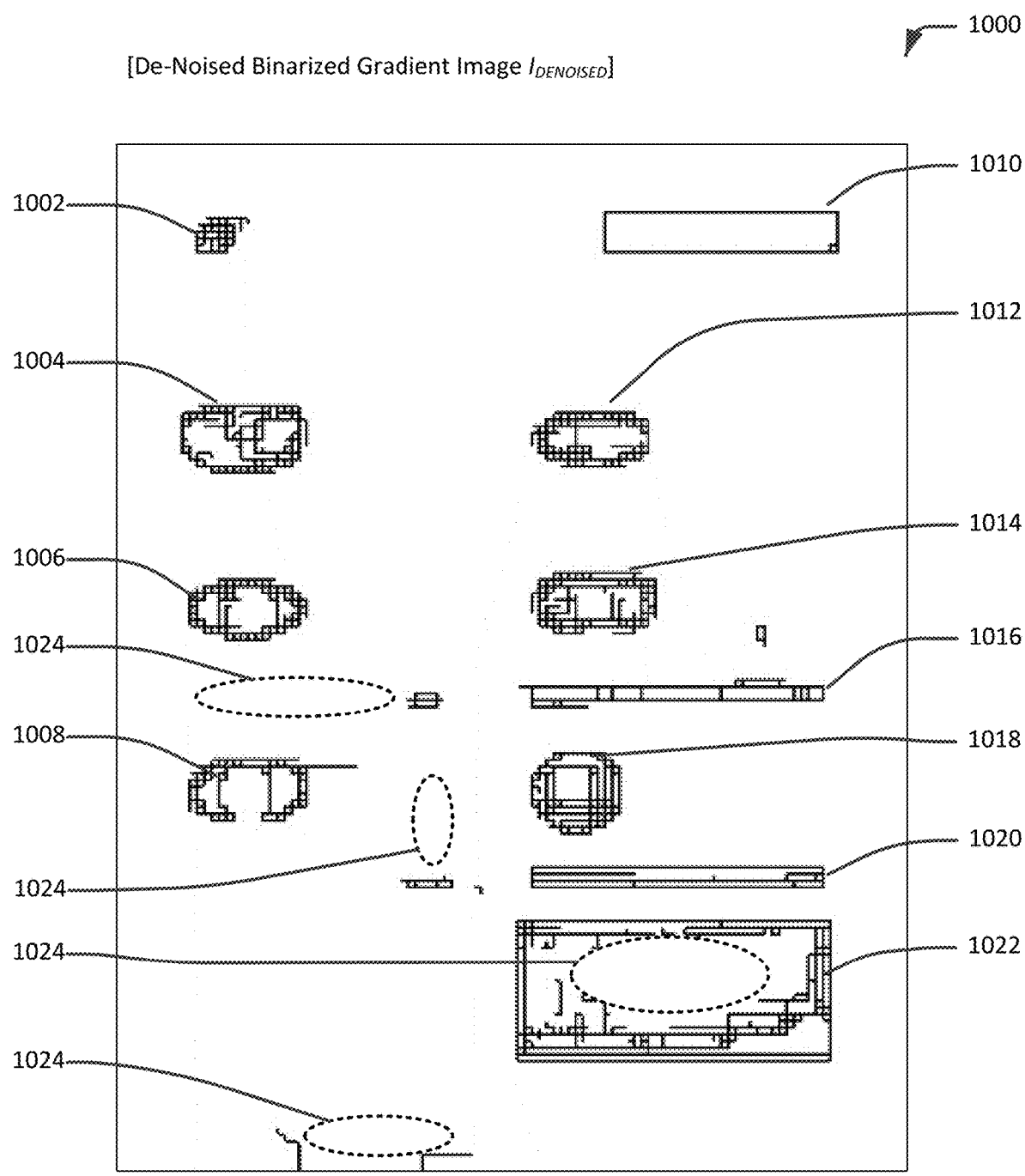
FIG. 10 is a diagram illustrating an example de-noised binarized gradient image ($I_{DENOISED}$) based on the binarized gradient image ($I_{GRADIENTS}$) of FIG. 9, in accordance with an embodiment of the present disclosure.

FIG. 10 is a diagram illustrating an example de-noised binarized gradient image ($I_{DENOISED}$) 1000 based on the binarized gradient image ($I_{BINARIZED}$) 900 of FIG. 9, in accordance with an embodiment of the present disclosure. $I_{DENOISED}$ 1000 is very similar to $I_{BINARIZED}$ 900, except for the exclusion of the undesired black pixels, which were deemed to be insignificant components that may likely be noise or other undesired artifacts. As shown in FIG. 10, $I_{DENOISED}$ 1000 includes de-noised black pixel clusters 1002, 1004, 1006, 1008, 1010, 1012, 1014, 1016, 1018, 1020, and 1022 which correspond to black pixel clusters 902, 904, 906, 908, 910, 912, 914, 916, 918, 920, and 922, respectively, in $I_{BINARIZED}$ 900. Note the absence of the undesired black pixels generally in areas 1024 in $I_{DENOISED}$ 1000, which were present in $I_{BINARIZED}$ 900. Also note the absence of certain black pixels in or about the black pixel clusters, as can generally be seen by the slight difference between de-noised black pixel clusters 1002, 1004, 1006, 1008, 1010, 1012, 1014, 1016, 1018, 1020, and 1022 in $I_{DENOISED}$ 1000 and corresponding black pixel clusters 902, 904, 906, 908, 910, 912, 914, 916, 918, 920, and 922, respectively, in $I_{BINARIZED}$ 900. Furthermore, note that $I_{DENOISED}$ 1000 also includes black pixels other than the black pixels associated with de-noised black pixel clusters 1002, 1004, 1006, 1008, 1010, 1012, 1014, 1016, 1018, 1020, and 1022. These other black pixels are black pixels whose bounding rectangle was deemed not to satisfy the size threshold, as described above.

Referring again to FIGS. 2A and 2B and process 200, at block 214, shadow removal module 106 dilates $I_{DENOISED}$ 1000 to generate a dilated noised removed binarized gradient image. $I_{DENOISED}$ 1000 includes de-noised black pixel clusters 1002, 1004, 1006, 1008, 1010, 1012, 1014, 1016, 1018, 1020, and 1022 which correspond to decidedly dark regions 702, 704, 706, 708, 710, 712, 714, 716, 718, 729, and 722, respectively, in $I_{LUMINANCE}$ 700 (the conventional shadow mask). Although de-noised black pixel clusters 1002, 1004, 1006, 1008, 1010, 1012, 1014, 1016, 1018, 1020, and 1022 in $I_{DENOISED}$ 1000 provide good indications of the locations of the respective image contents in original document image 600, the sizes of the de-noised black pixel clusters may not be good approximations of the sizes of the respective image contents in original document image 600. For example, the de-noised black pixel clusters may not adequately represent the size and shape of the respective image contents in original document image 600. In order to address the size issue, shadow removal module 106 can dilate $I_{DENOISED}$ 1000, according to some embodiments. In an example implementation, shadow removal module 106 can dilate $I_{DENOISED}$ 1000 using a morphological operation with a suitable structuring element, such as a 3 pixel×3 pixel structuring element, a 5 pixel×5 pixel structuring element, or any other suitable structuring element. The structuring element determines the extent the shapes, for instance, the de-noised black pixel clusters, in $I_{DENOISED}$ 1000 are expanded.

Figure 11:
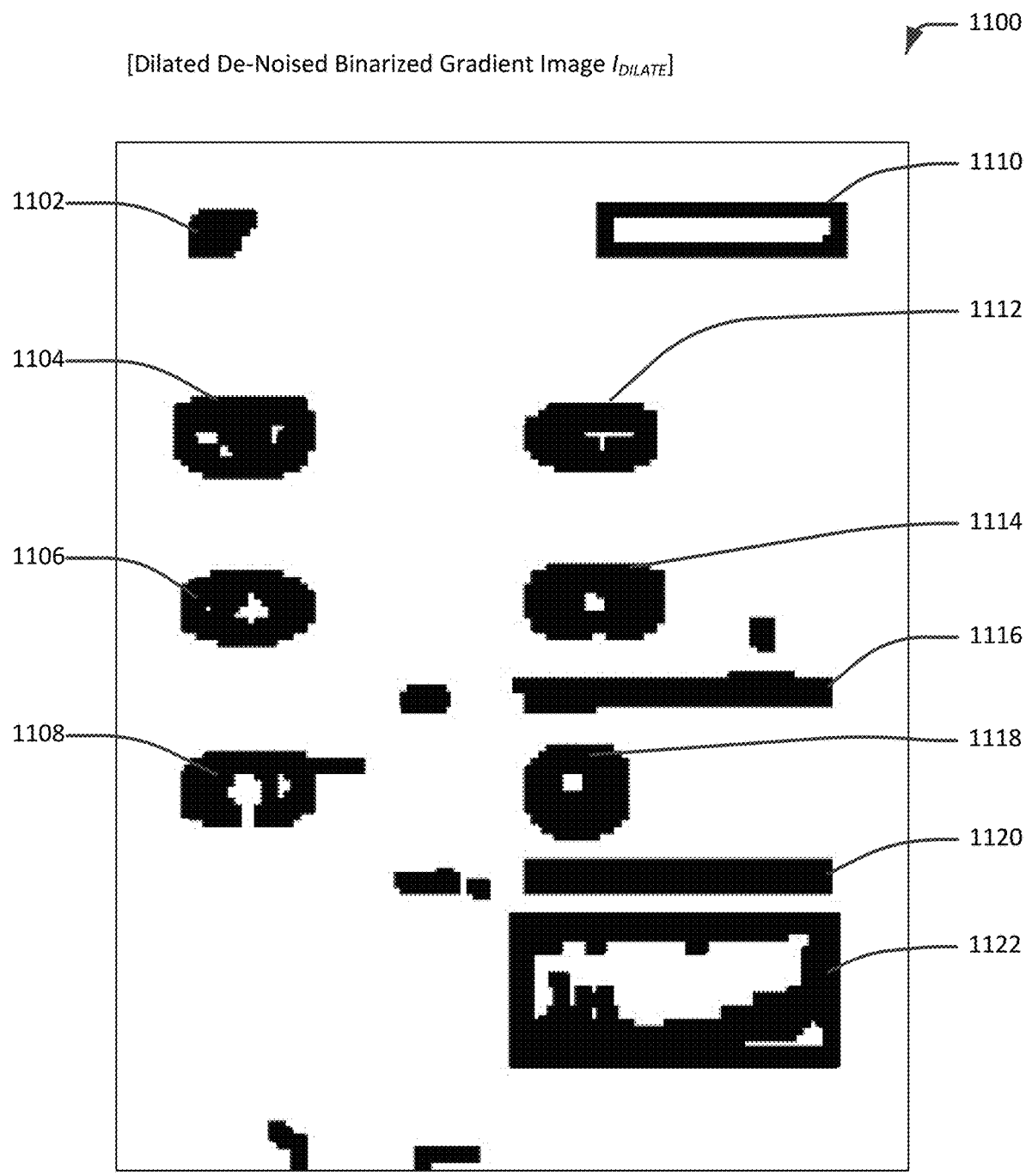
FIG. 11 is a diagram illustrating an example dilated de-noised binarized gradient image ($I_{DILATE}$) based on the de-noised binarized gradient image ($I_{DENOISED}$) of FIG. 10, in accordance with an embodiment of the present disclosure.

FIG. 11 is a diagram illustrating an example dilated de-noised binarized gradient image ($I_{DILATE}$) 1100 based on de-noised binarized gradient image ($I_{DENOISED}$) 1000 of FIG. 10, in accordance with an embodiment of the present disclosure. As shown in FIG. 11, $I_{DILATE}$ 1100 includes dilated de-noised black pixel clusters 1102, 1104, 1106, 1108, 1110, 1112, 1114, 1116, 1118, 1120, and 1122 which correspond to de-noised black pixel clusters 1002, 1004, 1006, 1008, 1010, 1012, 1014, 1016, 1018, 1020, and 1022, respectively, in $I_{DENOISED}$ 1000. The black pixels of the de-noised black pixel clusters in $I_{DENOISED}$ 1000 are dilated based on the applied structuring element to generate the corresponding dilated de-noised black pixel clusters in $I_{DILATE}$ 1100. Note that $I_{DILATE}$ 1100 may also include other dilated black pixels as a result of the black pixels other than the de-noised black pixel clusters present in $I_{DENOISED}$ 1000. Although the dilated de-noised black pixel clusters in $I_{DILATE}$ 1100 provide better approximations of the size of the respective image contents in original document image 600 as compared to de-noised black pixel clusters in $I_{DENOISED}$ 1000, the sizes of the dilated de-noised black pixel clusters may still not adequately represent the size of the respective image contents in original document image 600. Furthermore, the shapes of the dilated de-noised black pixel clusters may not correspond to the shapes of the respective image contents in original document image 600. Thus, using the dilated de-noised black pixel clusters to remove the decidedly dark regions from the conventional shadow mask may not sufficiently remove enough of the decidedly dark regions to account for (e.g., cover) the respective image contents in original document image 600. Instead, according to some embodiments provided herein, shadow removal module 106 processes original document image 600 to determine the sizes and shapes of the image contents, as will be further described with respect to blocks 216-220.

Referring again to FIGS. 2A and 2B and process 200, at block 216, shadow removal module 106 generates a median-filtered gray image based on original document image 600. Median filtering is a nonlinear digital filtering technique that removes the small components, such as noise, from the image while preserving the edges of the larger components in the image. In an example implementation, shadow removal module 106 can generate the median-filtered gray image by applying a median filter with a suitable window, such as a 3 pixel×3 pixel window, a 4 pixel×4 pixel window, a 5 pixel×5 pixel window, or any other suitable window, to original document image 600. In brief, the median filter operates by moving through the image, pixel by pixel, and replacing each pixel value with the median value of the neighboring pixels, where the neighboring pixels are determined by the applied window.

Figure 12:
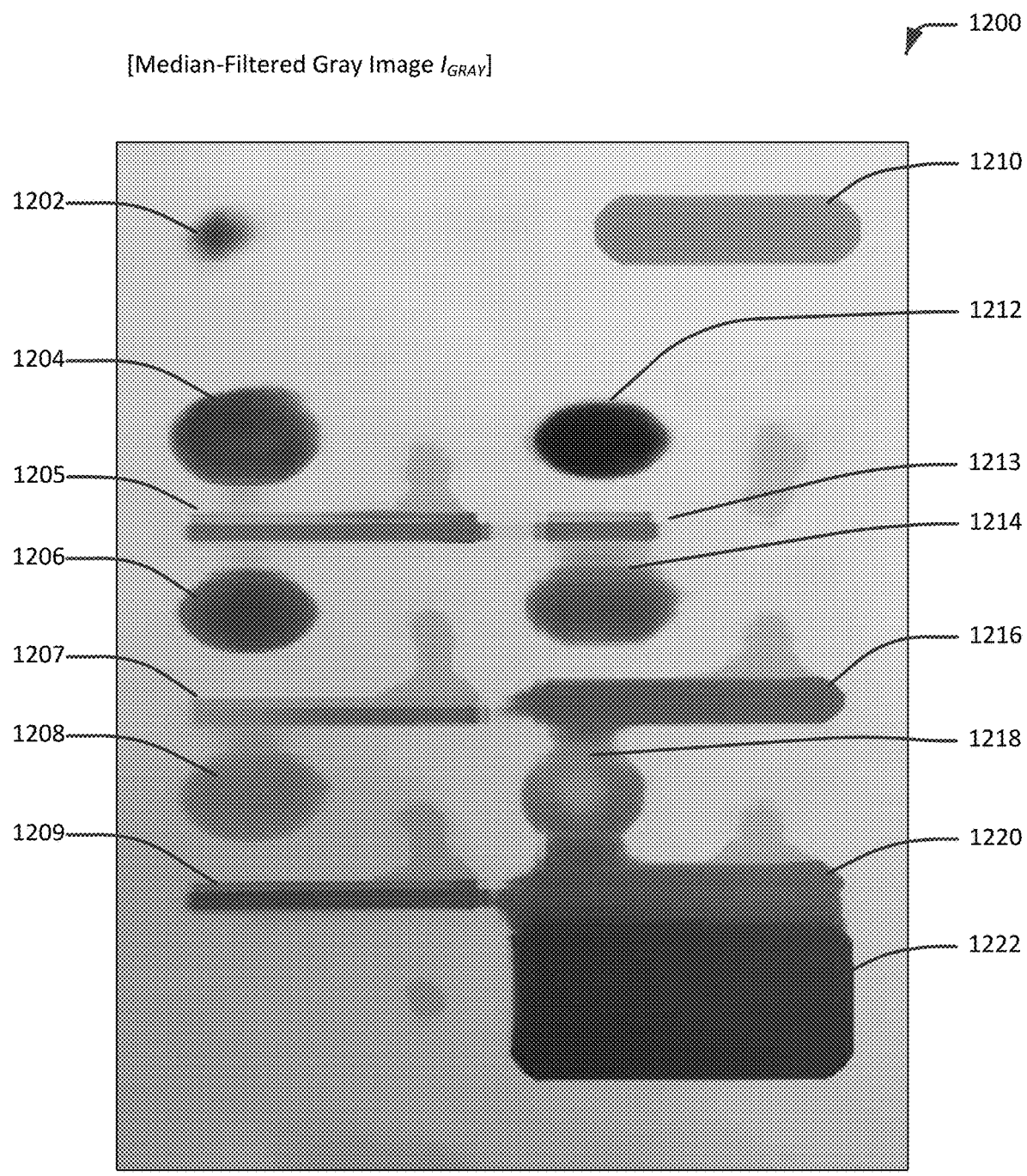
FIG. 12 is a diagram illustrating an example median-filtered gray image ($I_{GRAY}$) of the original document image of FIG. 6, in accordance with an embodiment of the present disclosure.

FIG. 12 is a diagram illustrating an example median-filtered gray image ($I_{GRAY}$) 1200 of original document image 600 of FIG. 6, in accordance with an embodiment of the present disclosure. As shown in FIG. 12, $I_{GRAY}$ 1200 is a gray scale image, which includes the large image contents in original document image 600. More specifically, $I_{GRAY}$ 1200 includes large components 1202, 1204, 1205, 1206, 1207, 1208, 1209, 1210, 1212, 1213, 1214, 1216, 1218, 1220, and 1222, which correspond to image contents 602, 604, 605, 606, 607, 608, 609, 610, 612, 613, 614, 616, 618, 620, and 622, respectively, in original document image 600. Note the absence of the small components (e.g., image contents of a small size), such as text and other small artifacts, of original document image 600 in $I_{GRAY}$ 1200. That is, the edges of such small components in original document image 600 are not preserved in $I_{GRAY}$ 1200. Also note that $I_{GRAY}$ 1200 includes large components that correspond to the large image contents in original document image 600 that are not included in $I_{LUMINANCE}$ 700. For instance, $I_{GRAY}$ 1200 includes large components 1205, 1207, 1209, and 1213 that correspond to image contents 605, 607, 609, and 611, which are not identified in $I_{LUMINANCE}$ 700. That is, $I_{LUMINANCE}$ 700 does not include decidedly dark regions for image contents 605, 607, 609, and 611. Accordingly, although the large components in $I_{GRAY}$ 1200 provide good approximations of the shapes and sizes of the image contents in original document image 600, $I_{GRAY}$ 1200 in its current state is not suitable for removing the decidedly dark regions in $I_{LUMINANCE}$ 700 due to the presence of the undesired large components that correspond to the large image contents in original document image 600 that are not identified in $I_{LUMINANCE}$ 700. Rather, what is needed is knowledge of which large components in $I_{GRAY}$ 1200 correspond to the decidedly dark regions in $I_{LUMINANCE}$ 700. However, the locations of the decidedly dark regions in $I_{LUMINANCE}$ 700 are indicated by the dilated de-noised black pixel clusters in $I_{DILATE}$ 1100. In order to identify the large components in $I_{GRAY}$ 1200 that correspond to the decidedly dark regions in $I_{LUMINANCE}$ 700, according to some embodiments, shadow removal module 106 utilizes the location indicated by the dilated de-noised black pixel clusters in $I_{DILATE}$ 1100. Moreover, as will be further explained with respect to blocks 218 and 220, shadow removal module 106 uses such location information to generate a binary image that includes the large components in $I_{GRAY}$ 1200 that correspond to the decidedly dark regions in $I_{LUMINANCE}$ 700, and effectively excludes the other large components in $I_{GRAY}$ 1200 that do not have corresponding decidedly dark regions in $I_{LUMINANCE}$ 700.

Referring again to FIGS. 2A and 2B and process 200, at block 218, shadow removal module 106 performs a connected component analysis on $I_{DILATE}$ 1100. As described previously, the connected component analysis identifies and labels the connected black pixels as connected components in an image. In the case of $I_{DILATE}$ 1100, the connected component analysis identifies and labels the connected black pixels, such as the black pixels associated with the dilated de-noised black pixel clusters, and the other black pixels, in $I_{DILATE}$ 1100. Shadow removal module 106 can use the connected components in $I_{DILATE}$ 1100 as location information to generate the binary image from $I_{GRAY}$ 1200.

At block 220, shadow removal module 106 binarizes $I_{GRAY}$ 1200 to generate a binarized median-filtered gray image that includes the large components in $I_{GRAY}$ 1200 that correspond to the decidedly dark regions in $I_{LUMINANCE}$ 700, and effectively excludes the other large components in $I_{GRAY}$ 1200 that do not have corresponding decidedly dark regions in $I_{LUMINANCE}$ 700. In an example implementation, shadow removal module 600 can binarize $I_{GRAY}$ 1200 using any existing thresholding technique, such as the OTSU segmentation algorithm, to generate a binarized median-filtered gray image $I_{OTSU}$ 1300. In brief, the OTSU segmentation algorithm is a clustering-based image segmentation (thresholding) process for generating a binary image from a grayscale image. Other suitable thresholding techniques such as NiBlack's thresholding, Sauvola's thresholding, color-based thresholding, histogram shape-based thresholding, iterative thresholding, and Watershed thresholding, to name a few examples, may be used to generate the binary image, as will be apparent to one of skill in the art.

FIG. 4 is a flow diagram illustrating an example process to generate binarized median-filtered gray image ($I_{OTSU}$) 1300 from median-filtered gray image ($I_{GRAY}$) 1200 using the OTSU segmentation algorithm, in accordance with an embodiment of the present disclosure. The process is initialized at block 402. At block 404, shadow removal module 106 determines a minimal bounding rectangle for each connected component in $I_{DILATE}$1100. As previously explained, each minimal bounding rectangle specifies the maximum extents of the respective connected component. At block 404, shadow removal module 106 binarizes the regions in $I_{GRAY}$ 1200 corresponding to the minimal bounding rectangles in $I_{DILATE}$ 1100 using the OTSU segmentation algorithm. Having binarized the regions in $I_{GRAY}$ 1200 corresponding to the minimal bounding rectangles in $I_{DILATE}$ 1100 to generate binarized image $I_{OTSU}$ 1300, shadow removal module 106, at block 408, returns.

Figure 13:
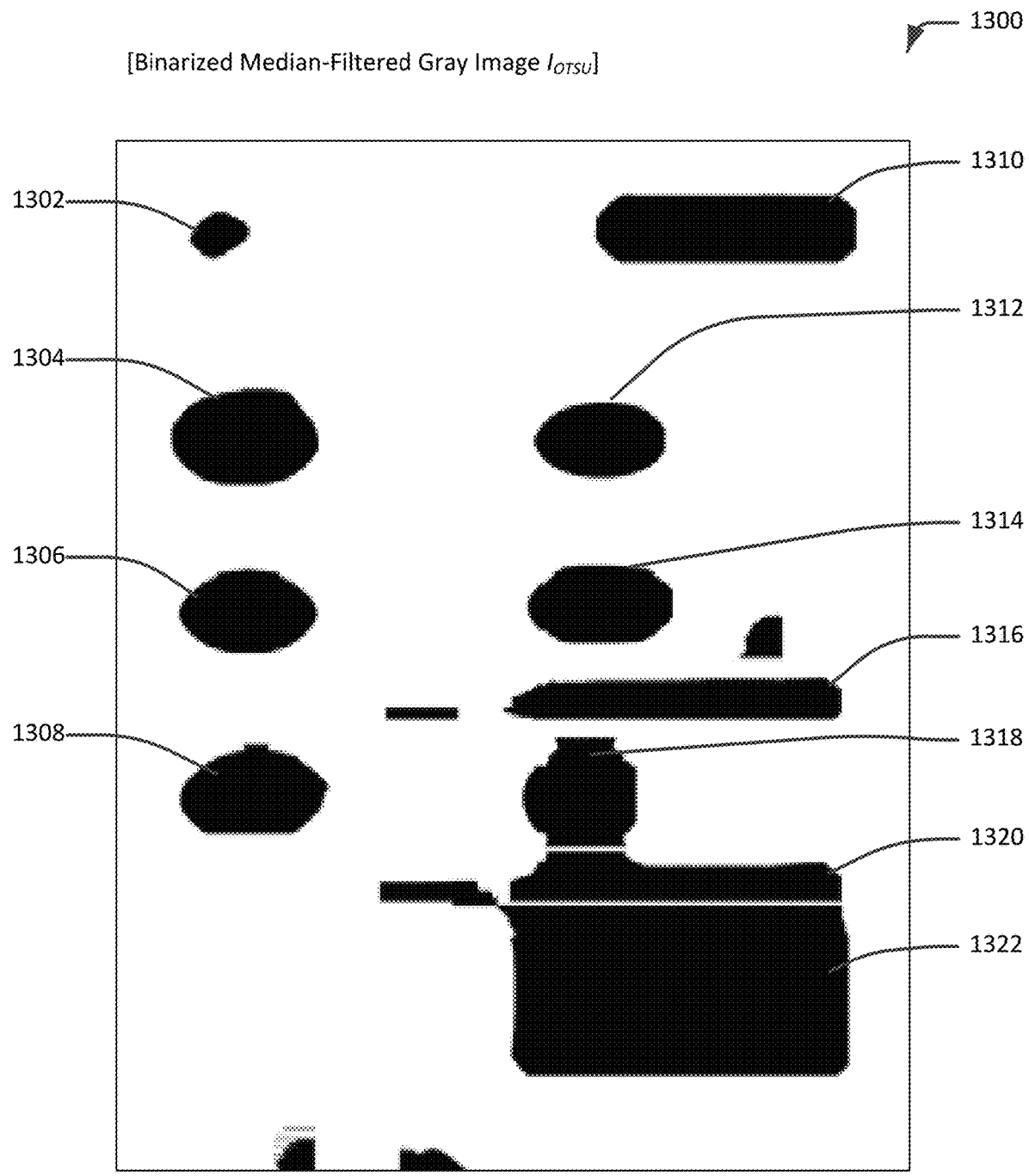
FIG. 13 is a diagram illustrating an example $I_{OTSU}$ based on $I_{GRAY}$ of FIG. 12, in accordance with an embodiment of the present disclosure.

FIG. 13 is a diagram illustrating $I_{OTSU}$ 1300 based on $I_{GRAY}$ 1200 of FIG. 12, in accordance with an embodiment of the present disclosure. $I_{OTSU}$ 1300 is a binary image that is somewhat similar to $I_{GRAY}$ 1200, except for the exclusion of the undesired large components in $I_{GRAY}$ 1200 that do not have corresponding decidedly dark regions in $I_{LUMINANCE}$ 700. As shown in FIG. 13, $I_{OTSU}$ 1300 includes binarized large component black pixel clusters 1302, 1304, 1306, 1308, 1310, 1312, 1314, 1316, 1318, 1320, and 1322 which correspond to dilated de-noised black pixel clusters 1102, 1104, 1106, 1108, 1110, 1112, 1114, 1116, 1118, 1120, and 1122, respectively, in $I_{DILATE}$ 1100. Note the exclusion of large components 1205, 1207, 1209, and 1213 of $I_{GRAY}$ 1200 in $I_{OTSU}$ 1300. That is, $I_{OTSU}$ 1300 does not include black pixels that represent large components 1205, 1207, 1209, and 1213 in $I_{GRAY}$ 1200 due to $I_{LUMINANCE}$ 700 not having decidedly dark regions for image contents 605, 607, 609, and 613 in original document image 600. Also note that $I_{OTSU}$ 1300 includes other black pixel clusters in addition to binarized large component black pixel clusters 1302, 1304, 1306, 1308, 1310, 1312, 1314, 1316, 1318, 1320, and 1322. Such other black pixel clusters may result from dilated black pixels other than the dilated de-noised black pixel clusters present in $I_{DILATE}$ 1100. Nevertheless, $I_{OTSU}$ 1300 includes binarized large component black pixel clusters that adequately approximate the locations, sizes, and shapes of the respective image contents in original document image 600. Moreover, as shown in FIGS. 7 and 13, each binarized large component black pixel cluster in $I_{OTSU}$ 1300 has a corresponding decidedly dark region in $I_{LUMINANCE}$ 700. Accordingly, $I_{OTSU}$ 1300 may be used to remove the decidedly dark regions from $I_{LUMINANCE}$ 700 to generate a shadow map, as will be further explained with respect to blocks 222, 224, and 226. The generated shadow map can then be used to remove the shadows from original document image 600.

In some embodiments, shadow removal module 106 may optionally segment and separately process any color regions that may be in an image so as to not degrade any color contained in the image. For instance, suppose an image is a color image that includes regions of or having color. In the case of a color image, shadow removal module 106 can identify the regions of the image that contain color, and modify the corresponding regions in the shadow mask in such a manner that no action is taken (e.g., no modification is made) for the color regions in the color image during the shadow removal process. However, the binarized median-filtered gray image does not provide any indication as to which ones of the binarized large component black pixel clusters correspond to color regions in the image. That is, shadow removal module 106 is not able to determine which ones, if any, of the binarized large component black pixel clusters in the binarized median-filtered gray image to segment and separately process so as to not degrade any color contained in the image. Instead, according to some embodiments provided herein, shadow removal module 106 identifies any color regions that may be in an image using a color pixel map of the image. In the case of original document image 600, shadow removal module 106 generates a color pixel map of original document image 600, and uses the color pixel map to identify any color regions that may be in original document image 600.

Referring again to FIGS. 2A and 2B and process 200, at block 222, shadow removal module 106 can optionally generate a color pixel map of original document image 600. The color pixel map provides a proximate classification of the regions where color content is present in original document image 600. The color pixel map of original document image 600 can be generated using any existing technique. One suitable technique is based on the Lab color space, which mathematically describes the perceivable colors in the three dimensions L for lightness, and a and b for the color components green-red and blue-yellow, respectively, based on nonlinearly compressed coordinates. In accordance with an embodiment, an example process for generating a color pixel map may be implemented using the following pseudo-code:

a. For each pixel in an image:
      compute the L, A, and B values from the RGB values; and
      using a suitable threshold value on the summation of the A and B values, determine whether the pixel is a colored pixel.

b. Let the color pixel map be $I_{CMAP}$.
c. To fill the holes in $I_{CMAP}$, generate an inverted image of $I_{CMAP}$.
d. Remove small components within a specified threshold from the inverted image of $I_{CMAP}$.
e. Invert the small component removed inverted image of $I_{CMAP}$ to generate the $I_{CMAP}$.

Referring to the pseudo code above, a hole in $I_{CMAP}$ refers to a set of white pixels enveloped or surrounded by black pixels. In the inverted $I_{CMAP}$, the black pixels in $I_{CMAP}$ are inverted to white pixels, and the white pixels in $I_{CMAP}$ are inverted to black pixels. Accordingly, in the inverted $I_{CMAP}$, a component is comprised of a set of connected black pixels and, according to some embodiments, the small components, which are components that are smaller than a specified threshold size, such as 20 pixels, are identified and removed from the inverted $I_{CMAP}$.

Figure 14:
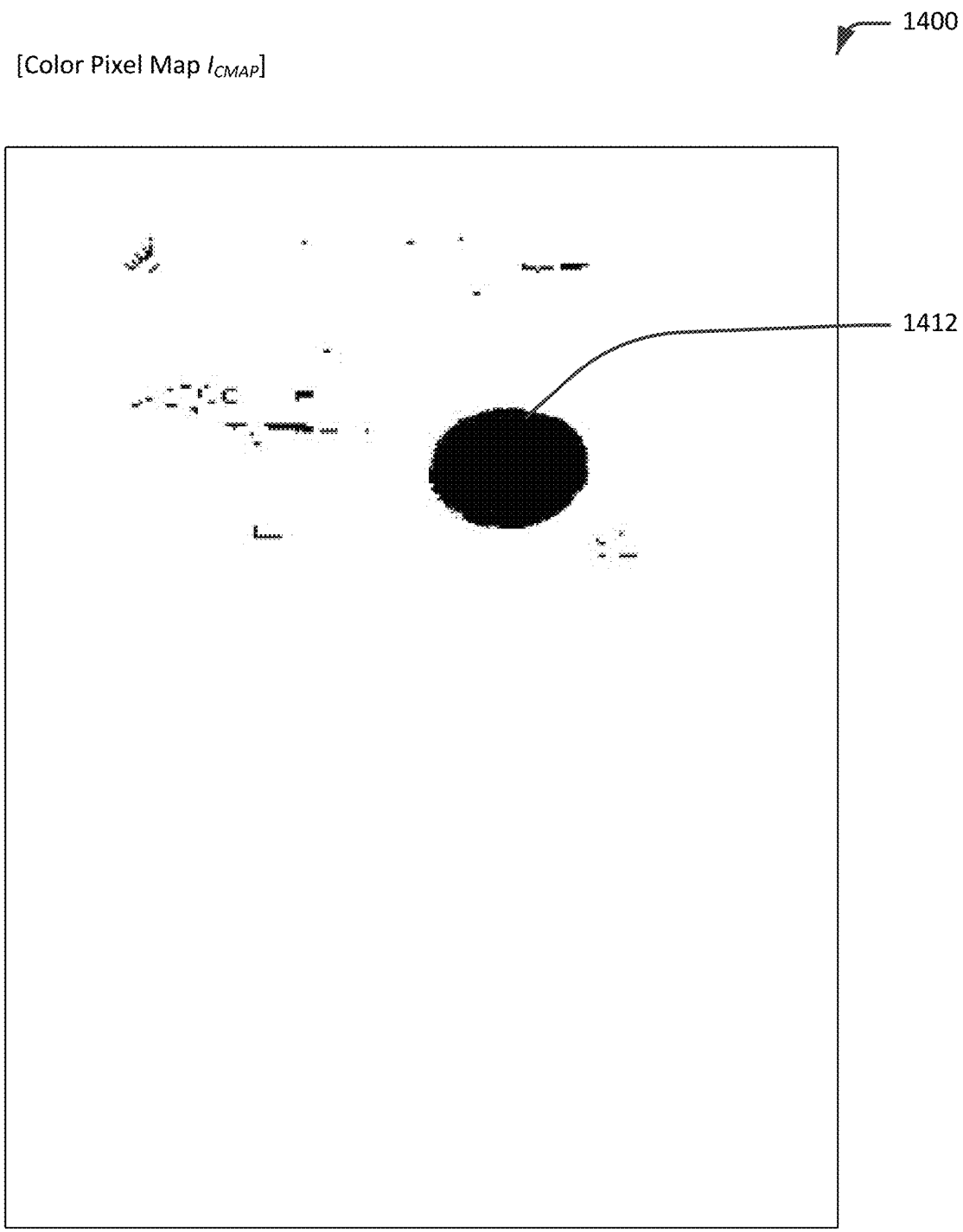
FIG. 14 is a diagram illustrating an example color pixel map ($I_{CMAP}$) based on the original document image of FIG. 6, in accordance with an embodiment of the present disclosure.

FIG. 14 is a diagram illustrating an example color pixel map ($I_{CMAP}$) 1400 based on the original document image of FIG. 6, in accordance with an embodiment of the present disclosure. As shown in FIG. 14, $I_{CMAP}$ 1400 may be a monochrome image, which includes a black pixel cluster 1412. Black pixel cluster 1412 includes a collection of black pixels. As described previously, original document image 600 includes image content 612, which is a color drawing. In $I_{CMAP}$ 1400, black pixel cluster 1412 corresponds to image content 612 in original document image 600. That is, black pixel cluster 1412 provides a proximate classification of the region of the color drawing (i.e., image content 612) in original document image 600. Note that $I_{CMAP}$ 1400 may also include black pixels other than black pixel cluster 1412, as can be seen in FIG. 14. These other black pixels may correspond to other regions of color content in original document image 600.

Referring again to FIGS. 2A and 2B and process 200, at block 224, shadow removal module 106 can optionally interpolate $I_{LUMINANCE}$ 700 using $I_{CMAP}$ 1400 to generate a partially interpolated shadow mask. In accordance with an embodiment, shadow removal module 106 can interpolate $I_{LUMINANCE}$ 700 by, for each black pixel in $I_{CMAP}$ 1400, setting the pixel intensity of the corresponding pixel of $I_{LUMINANCE}$ 700 to the pixel intensity value 255. A pixel intensity value of 255 (e.g., a white pixel for a gray scale image) for a pixel in a shadow map signifies that no action is required for that corresponding pixel in an image during the shadow removal process. For example, assuming pixel (300, 400) in $I_{CMAP}$ 1400 is a black pixel, shadow removal module 106 sets the pixel intensity of the corresponding pixel (300, 400) in $I_{LUMINANCE}$ 700 to the value 255. Once the pixels in $I_{LUMINANCE}$ 700 that correspond to the black pixels in $I_{CMAP}$ 1400 are processed in this manner, the resulting image is a partially interpolated $I_{LUMINANCE}$ 700.

Figure 15:
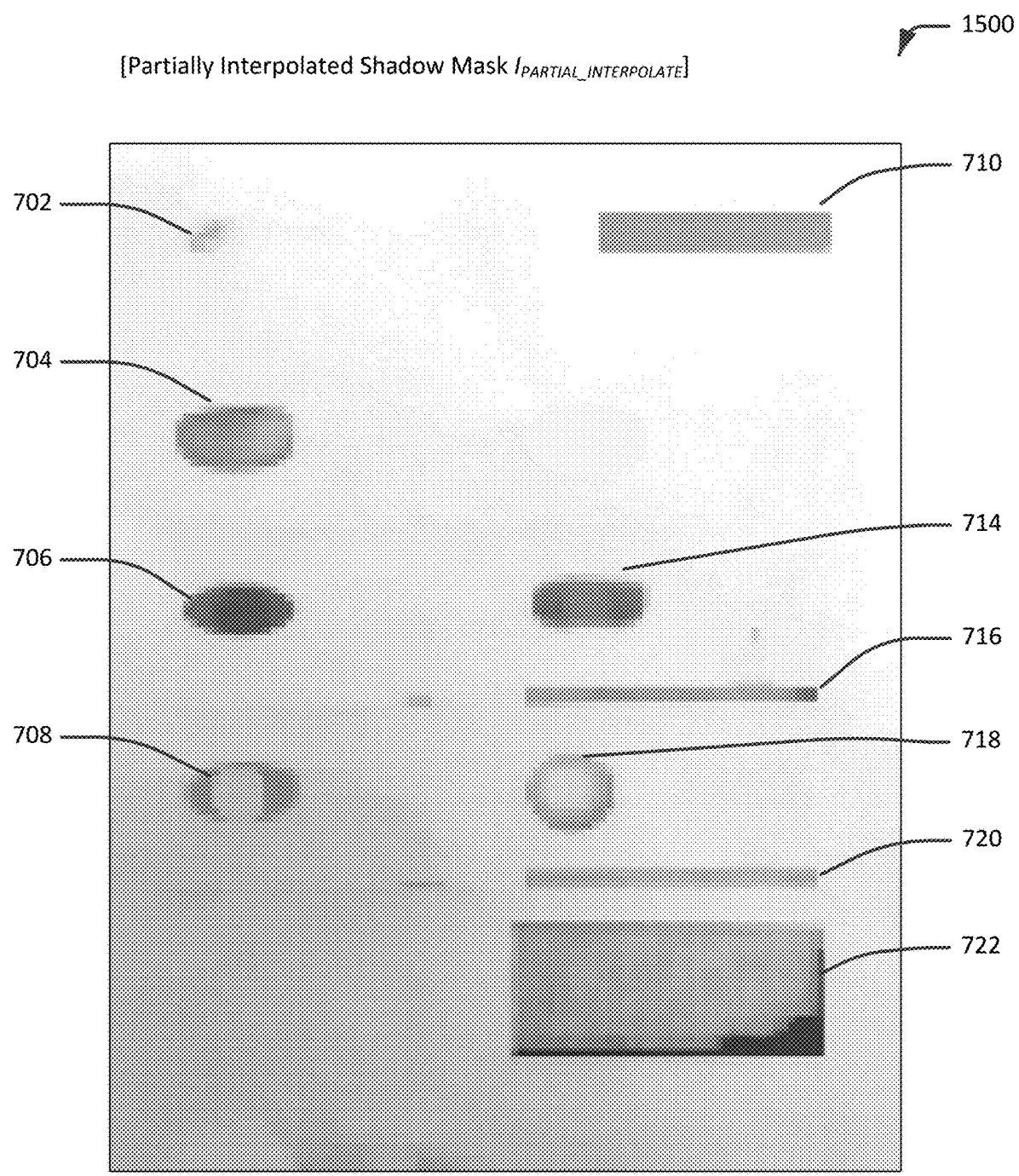
FIG. 15 is a diagram illustrating an example partially interpolated shadow mask ($I_{PARTIAL\_INTERPOLATE}$) 1500, in accordance with an embodiment of the present disclosure.

FIG. 15 is a diagram illustrating an example partially interpolated shadow mask ($I_{PARTIAL\_INTERPOLATE}$) 1500, in accordance with an embodiment of the present disclosure. $I_{PARTIAL\_INTERPOLATE}$ 1500 is very similar to $I_{LUMINANCE}$ 700, except for the replacement of the pixel intensity values for the pixels in $I_{LUMINANCE}$ 700 corresponding to the black pixels in $I_{CMAP}$ 1400. For instance, as shown in FIG. 15, $I_{PARTIAL\_INTERPOLATE}$ 1500 includes decidedly dark regions 702, 704, 706, 708, 710, 714, 716, 718, 720, and 722. Note the absence of decidedly dark region 712 from $I_{LUMINANCE}$ 700 in $I_{PARTIAL\_INTERPOLATE}$ 1500. More specifically, the pixels of decidedly dark region 712 in $I_{LUMINANCE}$ 700 are set to a pixel intensity value of 255, thus effectively excluding decidedly dark region 712 of $I_{LUMINANCE}$ 700 in $I_{PARTIAL\_INTERPOLATE}$ 1500. That is, setting the pixels of decidedly dark region 712 in $I_{LUMINANCE}$ 700 to a pixel intensity value of 255 effectively removes decidedly dark region 712 from $I_{LUMINANCE}$ 700. Accordingly, no action is taken during the shadow removal process for the pixels in original document image 600 (e.g., the pixels of the color drawing corresponding to decidedly dark region 712) corresponding to these pixels set to pixel intensity value of 255.

Referring again to FIGS. 2A and 2B and process 200, at block 226, shadow removal module 106 generates a shadow map of original document image 600 based on $I_{LUMINANCE}$ 700 and $I_{OTSU}$ 1300. In accordance with an embodiment, shadow removal module 106 uses the location information provided by the binarized large component black pixel clusters in $I_{OTSU}$ 1300 to effectively remove the decidedly dark regions in $I_{LUMINANCE}$ 700. In brief, shadow removal module 106 utilizes the location indicated by the binarized large component black pixel clusters in $I_{OTSU}$ 1300 to determine the locations of the decidedly dark regions in $I_{LUMINANCE}$ 700. Shadow removal module 106 then effectively removes each decidedly dark region in $I_{LUMINANCE}$ 700 by setting the pixel intensity of the pixels of the decidedly dark region to the average of the intensity values of the neighboring pixels. Note that in instances where shadow removal module 106 generates $I_{PARTIAL\_INTERPOLATE}$ 1500, shadow removal module 106 processes $I_{PARTIAL\_INTERPOLATE}$ 1500 to generate a shadow map. For example, in such instances, instead of effectively removing each decidedly dark region in $I_{LUMINANCE}$ 700, shadow removal module 106 effectively removes each decidedly dark region in $I_{PARTIAL\_INTERPOLATE}$ 1500 by setting the pixel intensity of the pixels of the decidedly dark region to the average of the intensity values of the neighboring pixels.

Figure 16:
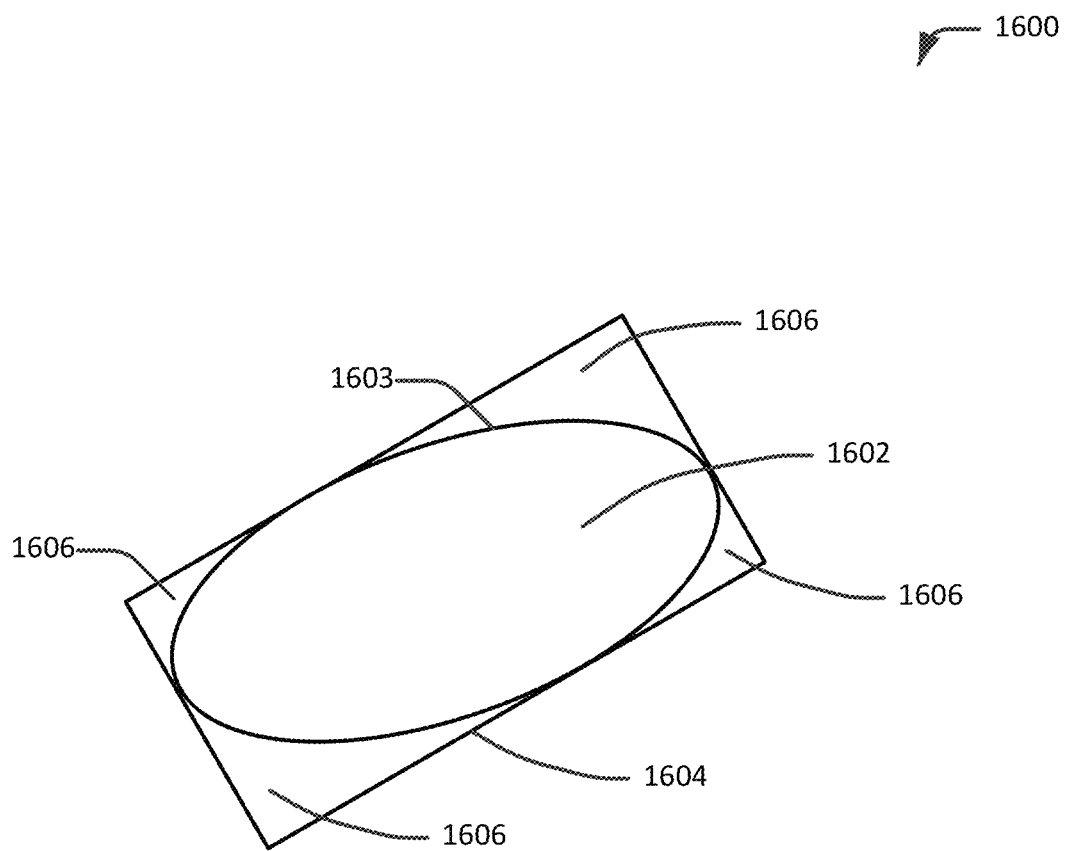
FIG. 16 is a diagram illustrating an example connected component and an example minimal bounding rectangle, in accordance with an embodiment of the present disclosure.

FIG. 5 is a flow diagram illustrating an example process to generate a shadow map based on $I_{LUMINANCE}$ 700 and $I_{OTSU}$ 1300, in accordance with an embodiment of the present disclosure. The process is initialized at block 502. At block 504, shadow removal module 106 performs a connected component analysis on $I_{OTSU}$ 1300. At decision block 506, shadow removal module 106 checks to determine whether there is a connected component to process in $I_{OTSU}$ 1300. If there is a connected component to process, at block 508, shadow removal module 106 determines a minimal bounding rectangle for the connected component being processed. FIG. 16 is a diagram 1600 illustrating an example connected component 1602 and an example minimal bounding rectangle 1604, in accordance with an embodiment of the present disclosure. For example, connected component 1602 may be a connected component of a binarized large component black pixel cluster in $I_{OTSU}$ 1300. As shown in FIG. 16, minimal bounding rectangle 1604 envelops connected component 1602 and specifies the maximum extents of connected component 1602.

Referring again to FIG. 5, at block 510, shadow removal module 106 computes an average gradient value, $G_{BOX\_BOUNDARY}$, from $I_{LUMINANCE}$ 700 (or $I_{PARTIAL\_INTERPOLATE}$ 1500) along the corresponding boundary of the minimal bounding rectangle in $I_{OTSU}$ 1300. That is, shadow removal module 106 determines the pixels in $I_{LUMINANCE}$ 700 (or $I_{PARTIAL\_INTERPOLATE}$ 1500) that correspond to the boundary of the minimal bounding rectangle in $I_{OTSU}$ 1300, and computes the average gradient value of such determined pixels in $I_{LUMINANCE}$ 700 (or $I_{PARTIAL\_INTERPOLATE}$ 1500). For example, in the case of connected component 1602 and minimal bounding rectangle 1604 of FIG. 16, shadow removal module 106 determines the pixels in $I_{LUMINANCE}$ 700 (or $I_{PARTIAL\_INTERPOLATE}$

1500) that correspond to the boundary of minimal bounding rectangle 1604 in $I_{OTSU}$ 1300, and computes the average gradient value of the determined pixels in $I_{LUMINANCE}$ 700 (or $I_{PARTIAL\_INTERPOLATE}$ 1500).

Referring again to FIG. 5, at block 512, shadow removal module 106 computes an average gradient value, $G_{COMPONENT\_BOUNDARY}$, from $I_{LUMINANCE}$ 700 (or $I_{PARTIAL\_INTERPOLATE}$ 1500) along the corresponding boundary of the connected component in $I_{OTSU}$ 1300. That is, shadow removal module 106 determines the pixels in $I_{LUMINANCE}$ 700 (or $I_{PARTIAL\_INTERPOLATE}$ 1500) that correspond to the boundary of the connected component in $I_{OTSU}$ 1300, and computes the average gradient value of such determined pixels in $I_{LUMINANCE}$ 700 (or $I_{PARTIAL\_INTERPOLATE}$ 1500). For example, in the case of connected component 1602 and minimal bounding rectangle 1604 of FIG. 16, shadow removal module 106 determines the pixels in $I_{LUMINANCE}$ 700 (or $I_{PARTIAL\_INTERPOLATE}$ 1500) that correspond to a boundary 1603 of connected component 1602 in $I_{OTSU}$ 1300, and computes the average gradient value of the determined pixels in $I_{LUMINANCE}$ 700 (or $I_{PARTIAL\_INTERPOLATE}$ 1500).

Referring again to FIG. 5, at decision block 514, shadow removal module 106 checks to determine whether the average gradient value along the corresponding boundary of the connected component ($G_{COMPONENT\_BOUNDARY}$) is greater than the average gradient value along the corresponding boundary of the minimal bounding rectangle ($G_{BOX\_BOUNDARY}$). Here, shadow removal module 106 is checking to determine whether the average gradient value of the pixels along the boundary of the connected component in $I_{LUMINANCE}$ 700 (or $I_{PARTIAL\_INTERPOLATE}$ 1500) is greater than the average gradient value of the pixels along the boundary of the minimal bounding rectangle enveloping the connected component in $I_{LUMINANCE}$ 700 (or $I_{PARTIAL\_INTERPOLATE}$ 1500). If shadow removal module 106 determines that $G_{COMPONENT\_BOUNDARY}$ is greater than $G_{BOX\_BOUNDARY}$, shadow removal module 106 returns to decision block 506 to process the next connected component in $I_{OTSU}$ 1300. In this instance, $G_{COMPONENT\_BOUNDARY}$ being greater than $G_{BOX\_BOUNDARY}$ signifies that the connected component is likely to correspond to a white region in $I_{LUMINANCE}$ 700 (or $I_{PARTIAL\_INTERPOLATE}$ 1500). As shadows are generally not present in the white regions of a shadow mask, such white regions in $I_{LUMINANCE}$ 700 (or $I_{PARTIAL\_INTERPOLATE}$ 1500) need not be further processed (e.g., removed from $I_{LUMINANCE}$ 700 or $I_{PARTIAL\_INTERPOLATE}$ 1500).

Otherwise, if shadow removal module 106 determines that $G_{COMPONENT\_BOUNDARY}$ is not greater than $G_{BOX\_BOUNDARY}$, shadow removal module 106, at block 516, computes an average intensity value, $P_{AVERAGE}$, from $I_{LUMINANCE}$ 700 (or $I_{PARTIAL\_INTERPOLATE}$ 1500) based on the neighboring pixels of the connected component. In this instance, $G_{COMPONENT\_BOUNDARY}$ not being greater than $G_{BOX\_BOUNDARY}$ signifies that the connected component is likely to correspond to a dark region, and even a decidedly dark region in $I_{LUMINANCE}$ 700 (or $I_{PARTIAL\_INTERPOLATE}$ 1500). In accordance with an embodiment, the neighboring pixels of the connected component are the pixels that are located between the boundary of the connected component and the boundary of the minimal bounding rectangle enveloping the connected component. For example, in the case of connected component 1602 and minimal bounding rectangle 1604 of FIG. 16, the neighboring pixels may be the pixels in areas 1606, and shadow removal module 106 computes the average intensity value of such pixels in areas 1606. As will be appreciated, the neighboring pixels of a connected component may be a collection of pixels other than the pixels located between the boundary of the connected component and the boundary of the minimal bounding rectangle enveloping the connected component. For instance, in some embodiments, the neighboring pixels of a connected component may comprise the collection of pixels extending outward n pixels from the boundary of the connected component.

Referring again to FIG. 5, at block 518, shadow removal module 106 interpolates the region in $I_{LUMINANCE}$ 700 (or $I_{PARTIAL\_INTERPOLATE}$ 1500) that corresponds to the connected component in $I_{OTSU}$ 1300 with $P_{AVERAGE}$. That is, shadow removal module 106 determines the pixels in $I_{LUMINANCE}$ 700 (or $I_{PARTIAL\_INTERPOLATE}$ 1500) that correspond to the connected component in $I_{OTSU}$ 1300, and sets the pixel intensity of each determined pixel in $I_{LUMINANCE}$ 700 (or $I_{PARTIAL\_INTERPOLATE}$ 1500) to the intensity value $P_{AVERAGE}$. In this manner, shadow removal module 106 effectively removes the dark region (or the decidedly dark region) that corresponds to the connected component from $I_{LUMINANCE}$ 700 (or $I_{PARTIAL\_INTERPOLATE}$ 1500). Moreover, in contrast to the processing of the decidedly dark regions corresponding to regions of color content as described herein, the pixels in $I_{LUMINANCE}$ 700 (or $I_{PARTIAL\_INTERPOLATE}$ 1500) corresponding to the connected component are set to intensity value $P_{AVERAGE}$ in contrast to, for example, 255. That is, shadow removal module 106 is not merely removing the dark region (or the decidedly dark region) from $I_{LUMINANCE}$ 700 (or $I_{PARTIAL\_INTERPOLATE}$ 1500), but replacing the pixel intensities of the pixels in the dark region (or the decidedly dark region) to the pixel intensities of the neighboring pixels. Accordingly, $I_{LUMINANCE}$ 700 (or $I_{PARTIAL\_INTERPOLATE}$ 1500) retains any shadow that may have been affecting the region of original document image 600 corresponding to the dark region (or the decidedly dark region) in $I_{LUMINANCE}$ 700 (or $I_{PARTIAL\_INTERPOLATE}$ 1500).

Having interpolated the region in $I_{LUMINANCE}$ 700 (or $I_{PARTIAL\_INTERPOLATE}$ 1500) corresponding to the connected component in $I_{OTSU}$ 1300 with $P_{AVERAGE}$, shadow removal module 106 returns to decision block 506 to process the next connected component in $I_{OTSU}$ 1300. If, at decision block 506, shadow removal module 106 determines that there is no more connected component to process in $I_{OTSU}$ 1300, shadow removal process, at block 520, returns. Once all the connected components are processed in this manner, the resulting image is an interpolated shadow mask, which is a shadow map.

Figure 17:
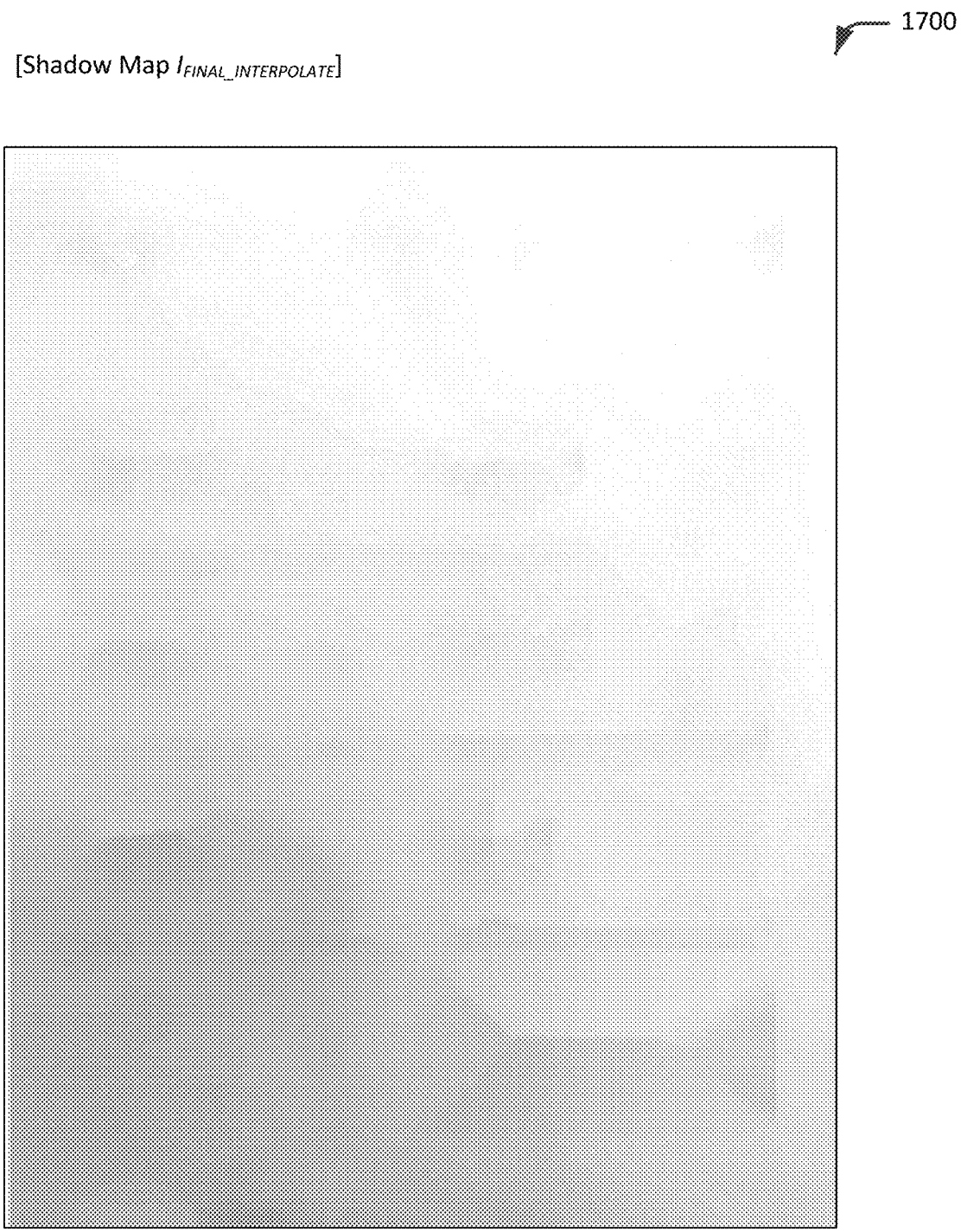
FIG. 17 is a diagram illustrating an example shadow map ($I_{FINAL\_INTERPOLATE}$), in accordance with an embodiment of the present disclosure.

FIG. 17 is a diagram illustrating an example shadow map ($I_{FINAL\_INTERPOLATE}$) 1700, in accordance with an embodiment of the present disclosure. As shown in FIG. 17, decidedly dark regions 702, 704, 706, 708, 710, 712, 714, 716, 718, 720, and 722 of $I_{LUMINANCE}$ 700 are not present in $I_{FINAL\_INTERPOLATE}$ 1700. That is, $I_{FINAL\_INTERPOLATE}$ 1700 is a shadow map of original document image 600 that identifies regions of shadows in original document image 600 and effectively excludes the dark regions that correspond to the image contents in original document image 600.

Referring again to FIGS. 2A and 2B and process 200, at block 228, shadow removal module 106 can perform smoothing of $I_{FINAL\_INTERPOLATE}$ 1700. Smoothing an image has the effect of eliminating pixel values which are unrepresentative of their surroundings, such as noise in the image. Shadow removal module 106 can smoothen $I_{FINAL\_INTERPOLATE}$ 1700 using any existing image smoothing technique. One suitable smoothing technique is a median filtering method that, for instance, replaces each pixel value in $I_{FINAL\_INTERPOLATE}$ 1700 with the average value of the pixel's neighbors, for example, as determined by a kernel (e.g., 3 pixel×3 pixel matrix, 5 pixel×5 pixel matrix, or any suitable size matrix), including the value of the pixel under consideration.

Figure 18:
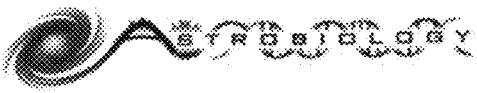
FIG. 18 is a diagram illustrating an example shadow removed document image corresponding to the original document image of FIG. 6, in accordance with an embodiment of the present disclosure.

At block 230, shadow removal module 106 removes the shadows from original document image 600 using $I_{FINAL\_INTERPOLATE}$ 1700. In an example implementation, shadow removal process 106 can remove the shadows from original document image 600 using any existing shadow removal technique that utilizes a shadow mask. One suitable shadow removal technique, for instance, updates the intensity value of each pixel in original document image 600 based on the intensity value of the corresponding pixel in $I_{FINAL\_INTERPOLATE}$ 1700. FIG. 18 is a diagram illustrating an example shadow removed document image 1800 corresponding to original document image 600 of FIG. 6, in accordance with an embodiment of the present disclosure. Process 200 ends at block 232.

Figure 19:
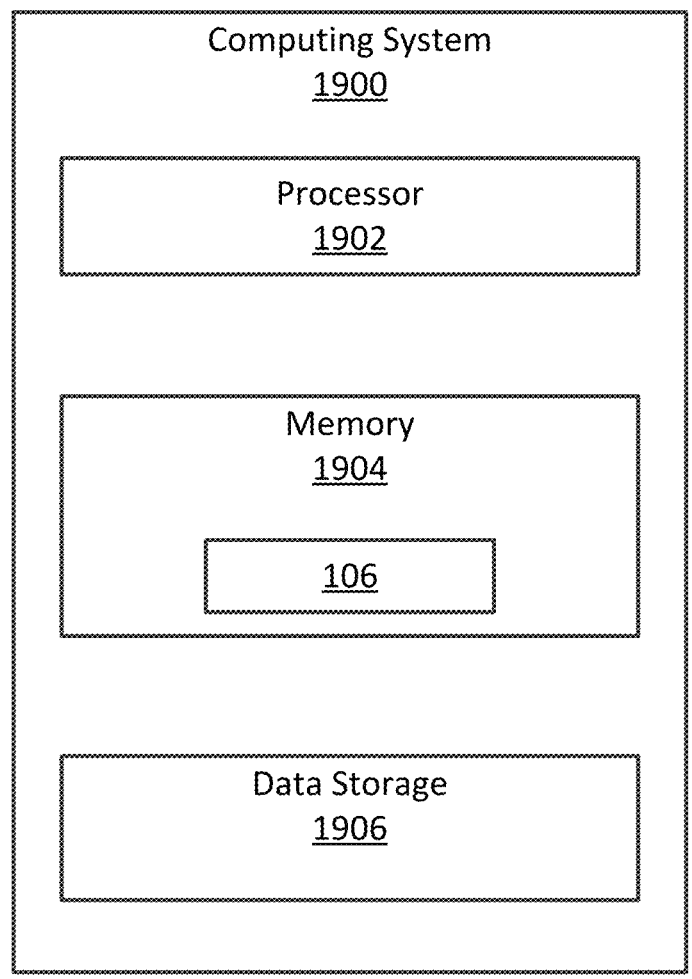
FIG. 19 illustrates selected components of an example computing system that may be used to perform any of the techniques as variously described in the present disclosure, according to an embodiment.

FIG. 19 illustrates selected components of example computing system 1900 that may be used to perform any of the techniques as variously described in the present disclosure, according to an embodiment. In some embodiments, computing system 1900 may be configured to implement or direct one or more operations associated with some or all of the engines, components and/or modules associated with shadow removal system 100. For example, shadow removal module 106 may be implemented in and/or using computing system 1900. In one example case, for instance, shadow removal module 106 is loaded in memory 1904 and executable by a processor 1902. Computing system 1900 may be any computer system, such as a workstation, desktop computer, server, laptop, handheld computer, tablet computer (e.g., the iPad™ tablet computer), mobile computing or communication device (e.g., the iPhone® mobile communication device, the Android® mobile communication device, and the like), or other form of computing or telecommunications device that is capable of video capture and/or communication and that has sufficient processor power and memory capacity to perform the operations described in this disclosure. A distributed computational system may be provided that includes a multiple of such computing devices. As depicted, computing system 1900 may include processor 1902, memory 1904, and data storage 1906. Processor 1902, memory 1904, and data storage 1906 may be communicatively coupled.

In general, processor 1902 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 1902 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 19, processor 1902 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 1902 may be configured to interpret and/or execute program instructions and/or process data stored in memory 1904, data storage 1906, or memory 1904 and data storage 1906. In some embodiments, processor 1902 may fetch program instructions from data storage 1906 and load the program instructions in memory 1904. After the program instructions are loaded into memory 1904, processor 1902 may execute the program instructions.

For example, in some embodiments, any one or more of the engines, components and/or modules of shadow removal system 100 may be included in data storage 1906 as program instructions. Processor 1902 may fetch some or all of the program instructions from data storage 1906 and may load the fetched program instructions in memory 1904. Subsequent to loading the program instructions into memory 1904, processor 1902 may execute the program instructions such that the computing system may implement the operations as directed by the instructions.

In some embodiments, virtualization may be employed in computing device 1900 so that infrastructure and resources in computing device 1900 may be shared dynamically. For example, a virtual machine may be provided to handle a process running on multiple processors so that the process appears to be using only one computing resource rather than multiple computing resources. Multiple virtual machines may also be used with one processor.

Memory 1904 and data storage 1906 may include computer-readable storage media for carrying or having computer-executable instructions or data structures stored thereon. Such computer-readable storage media may include any available media that may be accessed by a general-purpose or special-purpose computer, such as processor 1902. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1902 to perform a certain operation or group of operations.

Modifications, additions, or omissions may be made to computing system 1900 without departing from the scope of the present disclosure. For example, in some embodiments, computing system 1900 may include any number of other components that may not be explicitly illustrated or described herein.

As indicated above, the embodiments described in the present disclosure may include the use of a special purpose or a general purpose computer (e.g., processor 1902 of FIG. 19) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 1904 of FIG. 19) for carrying or having computer-executable instructions or data structures stored thereon.

Numerous example variations and configurations will be apparent in light of this disclosure. According to some examples, computer-implemented methods to generate a shadow map of a digital image are described. An example computer-implemented method may include: generating a shadow mask of a digital image; generating a binarized gradient image based on the shadow mask, the binarized gradient image being dilated and de-noised; generating a binarized median-filtered gray image based on the digital image and the binarized gradient image; and generating a shadow map based on the shadow mask and the binarized median-filtered gray image; wherein the shadow map is usable to remove shadows from the digital image.

In some examples, generating the dilated de-noised binarized gradient image based on the shadow mask includes: generating a gradient image from the shadow mask; and binarizing the generated gradient image to generate an initial binarized gradient image. In other examples, the method also includes: performing a connected component analysis on the initial binarized gradient image; and generating a de-noised binarized gradient image from the initial binarized gradient image. In still other examples, the method also includes dilating the de-noised binarized gradient image to generate the dilated de-noised binarized gradient image. In yet other examples, generating the binarized median-filtered gray image includes generating a median-filtered gray image based on the digital image. In further examples, generating the binarized median-filtered gray image includes: performing a connected component analysis on the binarized gradient image; binarizing the median-filtered gray image to generate the binarized median-filtered gray image. In still further examples, binarizing the median-filtered gray image includes: determining a minimal bounding rectangle for each connected component in the binarized gradient image; and binarizing regions in the median-filtered gray image corresponding to the minimal bounding rectangles in the binarized gradient image. In yet further examples, binarizing regions in the median-filtered gray image is based on a segmentation algorithm. In other examples, generating the shadow map includes: generating a color pixel map of the digital image, the color pixel map including multiple black pixels; and generating a partially interpolated shadow mask based on the shadow mask and the color pixel map; wherein the shadow map is based on the partially interpolated shadow mask and the binarized median-filtered gray image. In still other examples, generating the shadow map includes: performing a connected component analysis on the binarized median-filtered gray image, the connected component analysis generating at least one connected component in the binarized median-filtered gray image; computing an average intensity value from the shadow mask based on neighboring pixels of the at least one connected component; and interpolating a region in the shadow mask corresponding to the at least one connected component with the computed average intensity value. In yet other examples, computing the average intensity value from the shadow mask being computing the average intensity value from the partially interpolated shadow mask, and further wherein interpolating the region in the shadow mask being interpolating the region in the partially interpolated shadow mask. In further examples, the method also includes smoothening the shadow map. In still further examples, the digital image is a document image.

According to some examples, systems to generate a shadow map of a digital image are described. An example system may include: one or more non-transitory machine readable mediums configured to store instructions; and one or more processors configured to execute the instructions stored on the one or more non-transitory machine readable mediums. Execution of the instructions by the one or more processors may cause the one or more processors to: generate a shadow mask of a digital image; generate a binarized gradient image based on the shadow mask, the binarized gradient image being dilated and de-noised; generate a binarized median-filtered gray image based on the digital image and the binarized gradient image; and generate a shadow map based on the shadow mask and the binarized median-filtered gray image; wherein the shadow map is usable to remove shadows from the digital image.

In some examples, to generate the binarized gradient image based on the shadow mask includes generate a gradient image from the shadow mask and binarize the generated gradient image to generate an initial binarized gradient image, and the one or more non-transitory machine readable mediums may further store instructions that, in response to execution by the one or more processors, cause the one or more processors to: perform a connected component analysis on the initial binarized gradient image; and generate a de-noised binarized gradient image from the initial binarized gradient image. In other examples, to generate the binarized median-filtered gray image includes: generate a median-filtered gray image based on the digital image; perform a connected component analysis on the binarized gradient image; determine a minimal bounding rectangle for each connected component in the binarized gradient image; and binarize regions in the median-filtered gray image corresponding to the minimal bounding rectangles in the binarized gradient image. In still other examples, to generate the shadow map includes: generate a color pixel map of the digital image, the color pixel map including multiple black pixels; and generate a partially interpolated shadow mask based on the shadow mask and the color pixel map; wherein the shadow map is based on the partially interpolated shadow mask and the binarized median-filtered gray image. In yet other examples, to generate the shadow map includes: perform a connected component analysis on the binarized median-filtered gray image, the connected component analysis generating at least one connected component in the binarized median-filtered gray image; compute an average intensity value from the shadow mask based on neighboring pixels of the at least one connected component; and interpolate a region in the shadow mask corresponding to the at least one connected component with the computed average intensity value.

According to some examples, computer program products including one or more non-transitory machine readable mediums encoded with instructions that when executed by one or more processors cause a process to be carried out to generate a shadow map of a digital image are described. An example process may include: generating a shadow mask of a digital image; generating a binarized gradient image based on the shadow mask, the binarized gradient image being dilated and de-noised; generating a binarized median-filtered gray image based on the digital image and the binarized gradient image; and generating a shadow map based on the shadow mask and the binarized median-filtered gray image; wherein the shadow map is usable to remove shadows from the digital image.

In some examples, generating the shadow map includes: performing a connected component analysis on the binarized median-filtered gray image, the connected component analysis generating at least one connected component in the binarized median-filtered gray image; computing an average intensity value from the shadow mask based on neighboring pixels of the at least one connected component; and interpolating a region in the shadow mask corresponding to the at least one connected component with the computed average intensity value.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to generate a shadow map of a digital image, the method comprising:
    generating a shadow mask of a digital image;
    generating a binarized gradient image based on the shadow mask, the binarized gradient image being dilated and de-noised;
    generating a binarized median-filtered gray image based on the digital image and the binarized gradient image; and
    generating a shadow map based on the shadow mask and the binarized median-filtered gray image;
    wherein the shadow map is usable to remove shadows from the digital image.

2. The method of claim 1, wherein generating the binarized gradient image based on the shadow mask comprises:
    generating a gradient image from the shadow mask; and
    binarizing the generated gradient image to generate an initial binarized gradient image.

3. The method of claim 2, further comprising:
    performing a connected component analysis on the initial binarized gradient image; and
    generating a de-noised binarized gradient image from the initial binarized gradient image.

4. The method of claim 3, further comprising dilating the de-noised binarized gradient image to generate the dilated de-noised binarized gradient image.

5. The method of claim 1, wherein generating the binarized median-filtered gray image comprises generating a median-filtered gray image based on the digital image.

6. The method of claim 5, wherein generating the binarized median-filtered gray image further comprises:
    performing a connected component analysis on the binarized gradient image; and
    binarizing the median-filtered gray image to generate the binarized median-filtered gray image.

7. The method of claim 6, wherein binarizing the median-filtered gray image comprises:
    determining a minimal bounding rectangle for each connected component in the binarized gradient image; and
    binarizing regions in the median-filtered gray image corresponding to the minimal bounding rectangles in the binarized gradient image.

8. The method of claim 7, wherein binarizing regions in the median-filtered gray image is based on a segmentation algorithm.

9. The method of claim 1, wherein generating the shadow map comprises:
    generating a color pixel map of the digital image, the color pixel map comprising a plurality of black pixels; and
    generating a partially interpolated shadow mask based on the shadow mask and the color pixel map;
    wherein the shadow map is based on the partially interpolated shadow mask and the binarized median-filtered gray image.

10. The method of claim 1, wherein generating the shadow map comprises:
performing a connected component analysis on the binarized median-filtered gray image, the connected component analysis generating at least one connected component in the binarized median-filtered gray image;
computing an average intensity value from the shadow mask based on neighboring pixels of the at least one connected component; and
interpolating a region in the shadow mask corresponding to the at least one connected component with the computed average intensity value.

11. The method of claim 10, wherein computing the average intensity value from the shadow mask being computing the average intensity value from the partially interpolated shadow mask, and further wherein interpolating the region in the shadow mask being interpolating the region in the partially interpolated shadow mask.

12. The method of claim 1 further comprising smoothening the shadow map.

13. The method of claim 1, wherein the digital image is a document image.

14. A system to generate a shadow map of a digital image, the system comprising:
one or more non-transitory machine readable mediums configured to store instructions; and
one or more processors configured to execute the instructions stored on the one or more non-transitory machine readable mediums, wherein execution of the instructions causes the one or more processors to
generate a shadow mask of a digital image;
generate a binarized gradient image based on the shadow mask, the binarized gradient image being dilated and de-noised;
generate a binarized median-filtered gray image based on the digital image and the binarized gradient image; and
generate a shadow map based on the shadow mask and the binarized median-filtered gray image;
wherein the shadow map is usable to remove shadows from the digital image.

15. The system of claim 14, wherein to generate the binarized gradient image based on the shadow mask comprises generate a gradient image from the shadow mask and binarize the generated gradient image to generate an initial binarized gradient image, and further wherein the one or more non-transitory machine readable mediums further stores instructions that, in response to execution by the one or more processors, cause the one or more processors to:
perform a connected component analysis on the initial binarized gradient image; and
generate a de-noised binarized gradient image from the initial binarized gradient image.

16. The system of claim 14, wherein to generate the binarized median-filtered gray image comprises:
generate a median-filtered gray image based on the digital image;
perform a connected component analysis on the binarized gradient image;
determine a minimal bounding rectangle for each connected component in the binarized gradient image; and
binarize regions in the median-filtered gray image corresponding to the minimal bounding rectangles in the binarized gradient image.

17. The system of claim 14, wherein to generate the shadow map comprises:
generate a color pixel map of the digital image, the color pixel map comprising a plurality of black pixels; and
generate a partially interpolated shadow mask based on the shadow mask and the color pixel map;
wherein the shadow map is based on the partially interpolated shadow mask and the binarized median-filtered gray image.

18. The system of claim 14, wherein to generate the shadow map comprises:
perform a connected component analysis on the binarized median-filtered gray image, the connected component analysis generating at least one connected component in the binarized median-filtered gray image;
compute an average intensity value from the shadow mask based on neighboring pixels of the at least one connected component; and
interpolate a region in the shadow mask corresponding to the at least one connected component with the computed average intensity value.

19. A computer program product including one or more non-transitory machine readable mediums encoded with instruction that when executed by one or more processors cause a process to be carried out to generate a shadow map of a digital image, the process comprising:
generating a shadow mask of a digital image;
generating a binarized gradient image based on the shadow mask, the binarized gradient image being dilated and de-noised;
generating a binarized median-filtered gray image based on the digital image and the binarized gradient image; and
generating a shadow map based on the shadow mask and the binarized median-filtered gray image;
wherein the shadow map is usable to remove shadows from the digital image.

20. The computer program product of claim 19, wherein generating the shadow map comprises:
performing a connected component analysis on the binarized median-filtered gray image, the connected component analysis generating at least one connected component in the binarized median-filtered gray image;
computing an average intensity value from the shadow mask based on neighboring pixels of the at least one connected component; and
interpolating a region in the shadow mask corresponding to the at least one connected component with the computed average intensity value.

* * * * *